United States Patent
Fleizach et al.

(10) Patent No.: US 12,524,193 B2
(45) Date of Patent: Jan. 13, 2026

(54) USER INTERFACES FOR DETECTING OBJECTS

(71) Applicant: Apple Inc., Cupertino, CA (US)

(72) Inventors: Christopher B. Fleizach, Gilroy, CA (US); Allison Lettiere, San Francisco, CA (US); Cole A. Gleason, Seattle, WA (US); Darren C. Minifie, Santa Cruz, CA (US); Nandini Kannamangalam Sundara Raman, Sunnyvale, CA (US); Ryan N. Dour, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 38 days.

(21) Appl. No.: 18/319,409

(22) Filed: May 17, 2023

(65) Prior Publication Data
US 2023/0376266 A1    Nov. 23, 2023

Related U.S. Application Data

(60) Provisional application No. 63/364,877, filed on May 17, 2022.

(51) Int. Cl.
| | | |
|---|---|---|
| *G06F 3/16* | (2006.01) | |
| *G06V 10/46* | (2022.01) | |
| *G06V 20/52* | (2022.01) | |
| *G06V 30/18* | (2022.01) | |
| *H04N 23/63* | (2023.01) | |

(52) U.S. Cl.
CPC .............. *G06F 3/16* (2013.01); *G06V 10/46* (2022.01); *G06V 20/52* (2022.01); *G06V 30/18143* (2022.01); *H04N 23/631* (2023.01)

(58) Field of Classification Search
CPC .. G06V 10/46; G06V 20/52; G06V 30/18143; G06V 40/20; G06V 40/23; G01C 21/20; H04N 23/631; H04N 21/23418; G06F 3/16; G02B 2027/014; G06T 7/20; G08B 13/19602; G08B 13/19608; G08B 13/19615; G08B 13/19623; G08B 13/19671; G08B 13/19678;
(Continued)

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |

(Continued)

FOREIGN PATENT DOCUMENTS

| | | |
|---|---|---|
| WO | 2013/169849 A2 | 11/2013 |
| WO | 2014/105276 A1 | 7/2014 |

OTHER PUBLICATIONS

International Search Report received for PCT Application No. PCT/US2023/022607, mailed on Jan. 5, 2024, 7 pages.
(Continued)

*Primary Examiner* — Thai Q Tran
*Assistant Examiner* — Nienru Yang
(74) *Attorney, Agent, or Firm* — Kubota & Basol LLP

(57) ABSTRACT

In some embodiments, an computer system detects objects, such as physical objects in the physical environment of the electronic device. In some embodiments, the computer system presents indications of characteristics of the physical objects. In some embodiments, the physical objects are entry points to physical locations.

27 Claims, 25 Drawing Sheets

(58) Field of Classification Search
CPC ........ G08B 13/19682; G08B 13/19686; G08B 13/19689
USPC ...................................................... 348/143
See application file for complete search history.

(56) References Cited

U.S. PATENT DOCUMENTS

| | | | |
|---|---|---|---|
| 6,677,932 B1 | 1/2004 | Westerman | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,140,554 B2 * | 9/2015 | Jerauld | G09B 21/006 |
| 9,348,458 B2 | 5/2016 | Hotelling et al. | |
| 9,933,937 B2 | 4/2018 | Lemay et al. | |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2015/0211858 A1 | 7/2015 | Jerauld | |
| 2018/0357871 A1 * | 12/2018 | Siminoff | G08B 13/189 |
| 2021/0097768 A1 * | 4/2021 | Malia | G06F 3/04845 |
| 2021/0385417 A1 * | 12/2021 | Park | G06F 3/0484 |
| 2022/0084374 A1 * | 3/2022 | Dour | G06T 11/00 |

OTHER PUBLICATIONS

Dietz, et al., Exploring Eye-Tracking-Driven Sonification for the Visually Impaired, Available Online at: <http://dx.doi.org/10.1145/2875194.2875208>, Feb. 25, 2016, 8 pages.

* cited by examiner

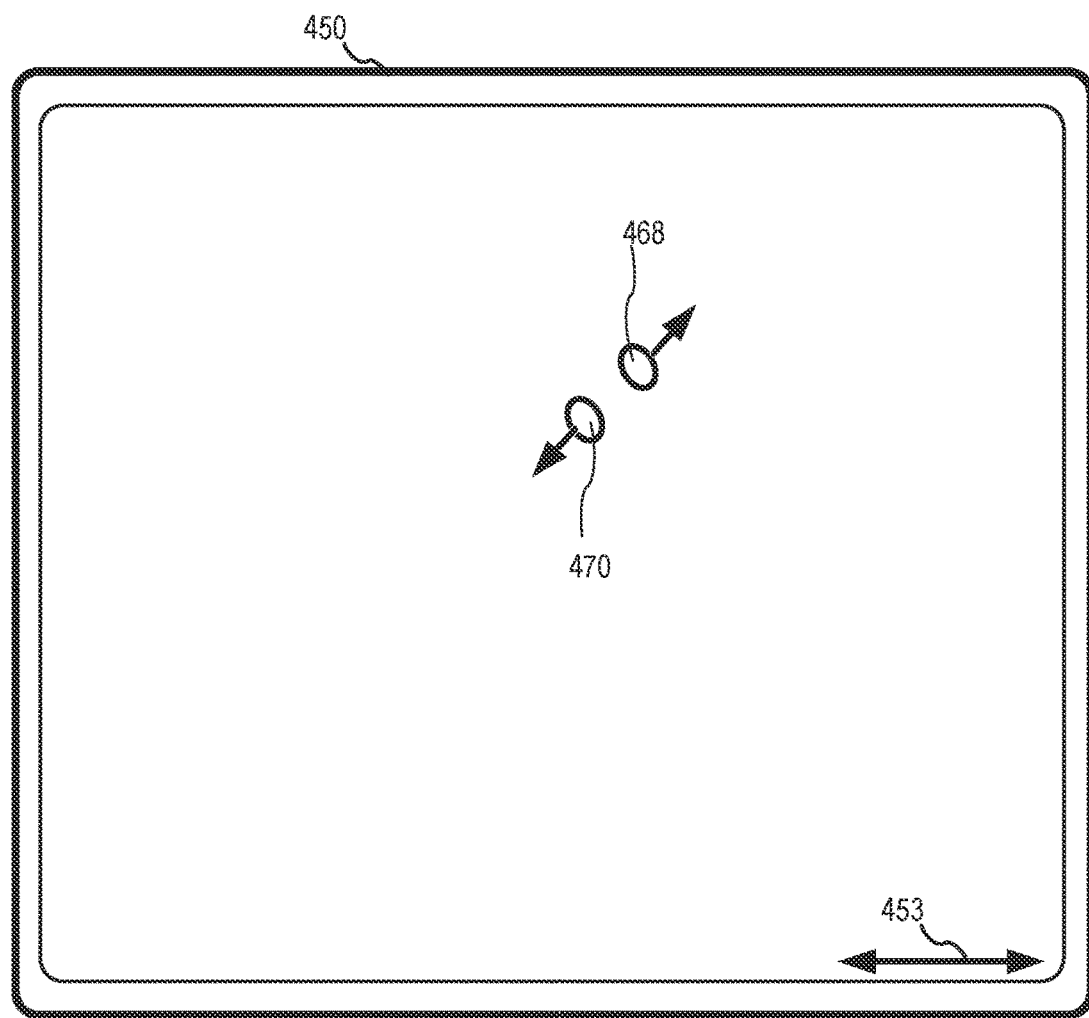
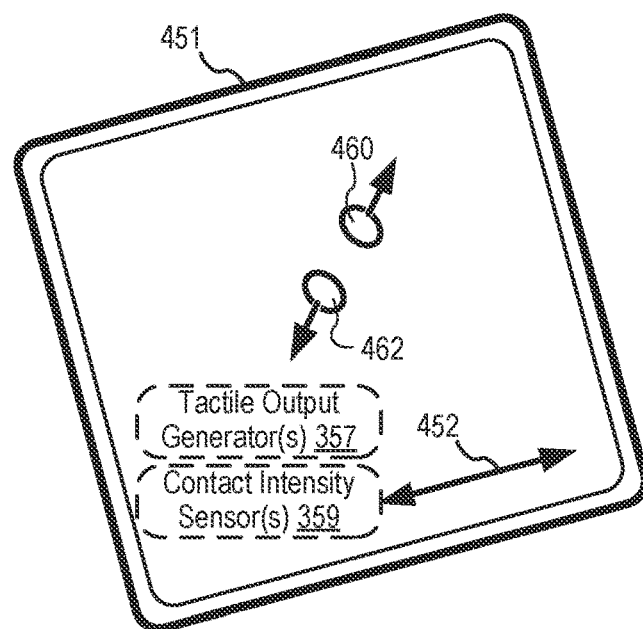
*FIG. 4B*

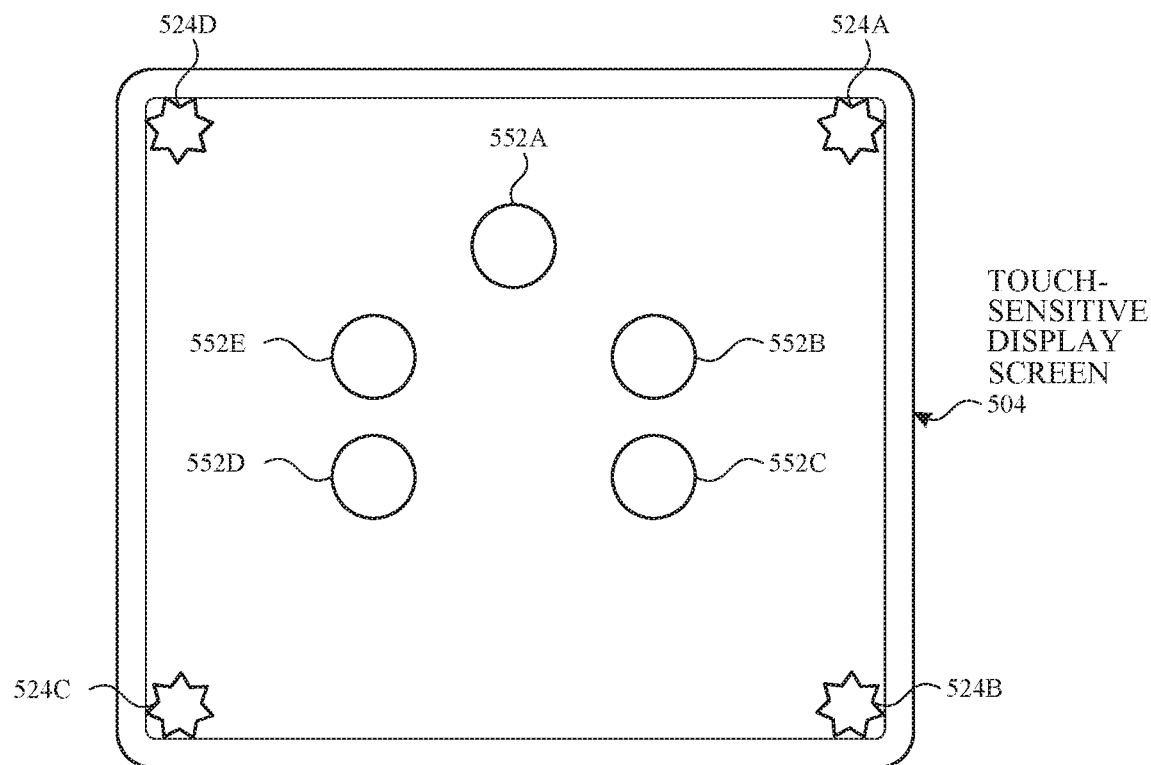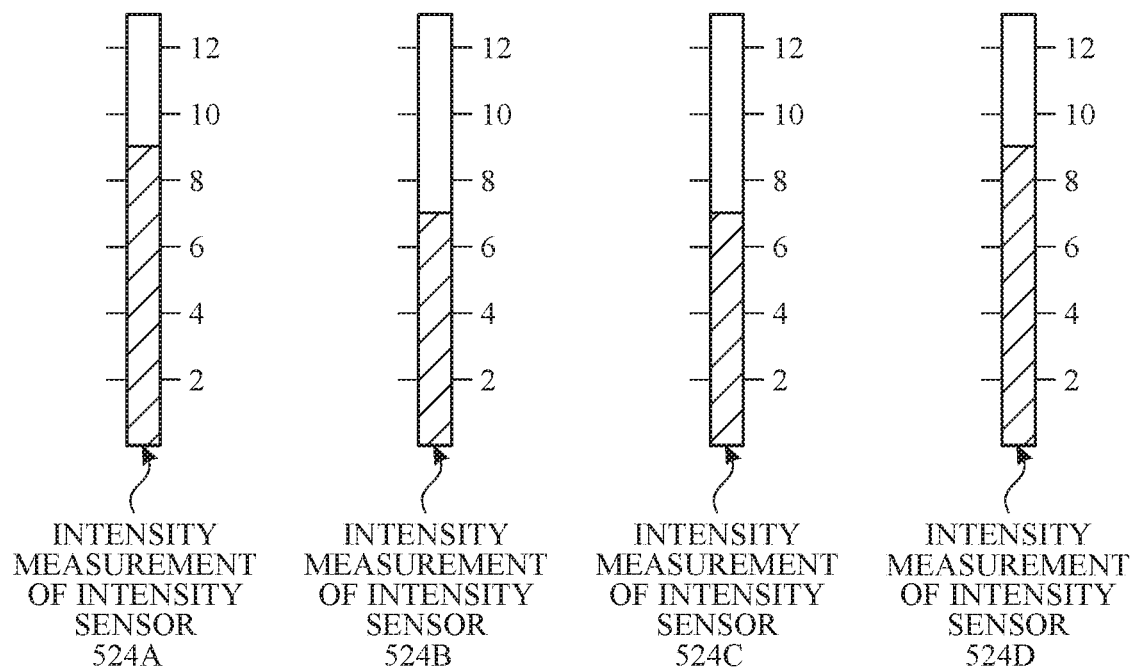
FIG. 5C

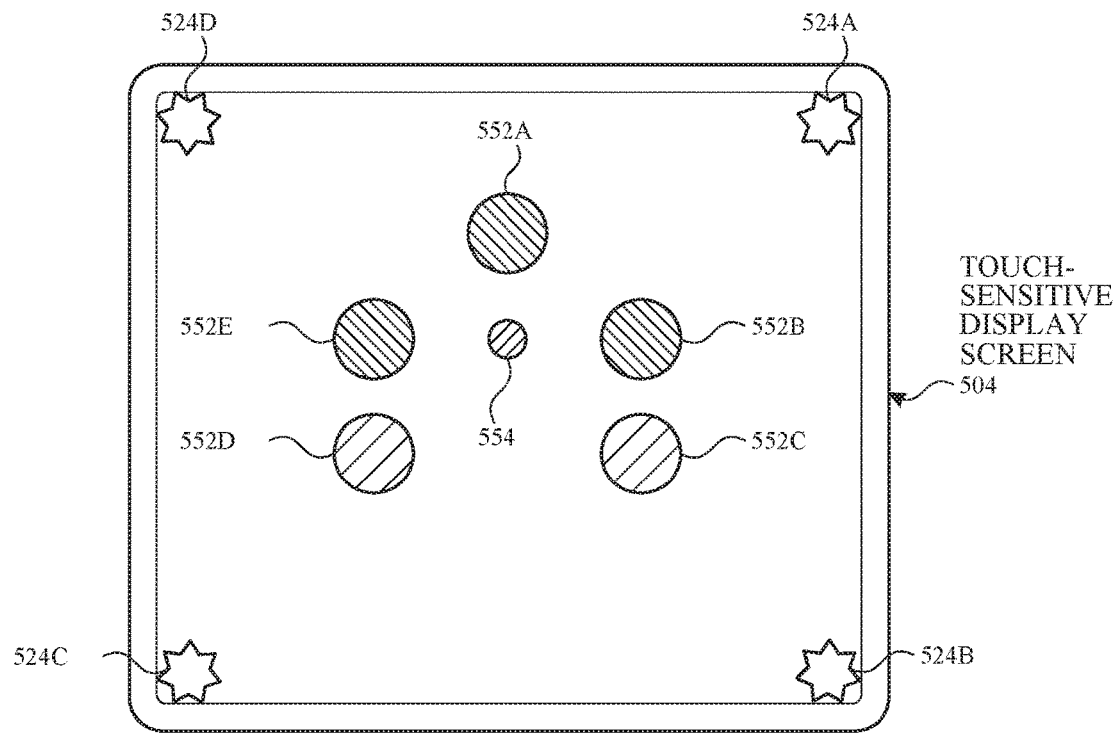
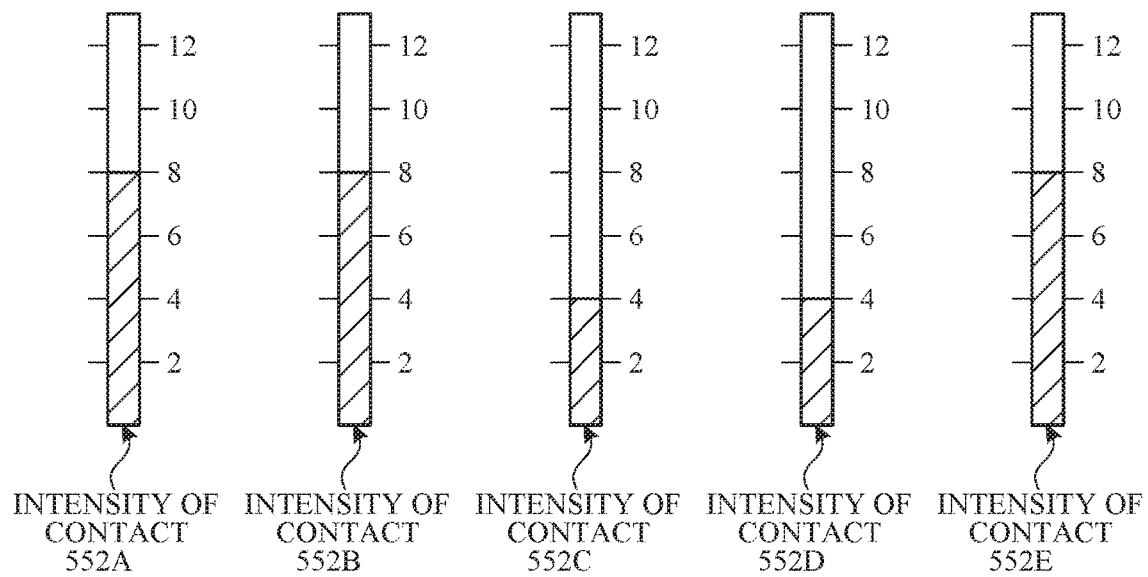
FIG. 5D

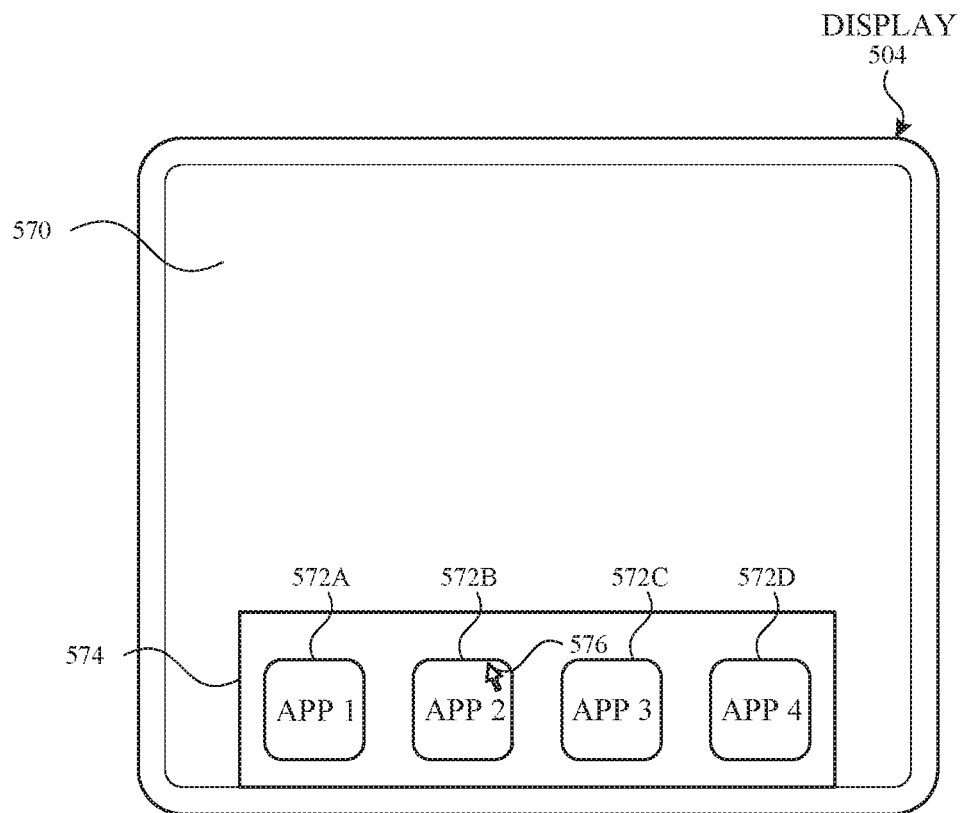
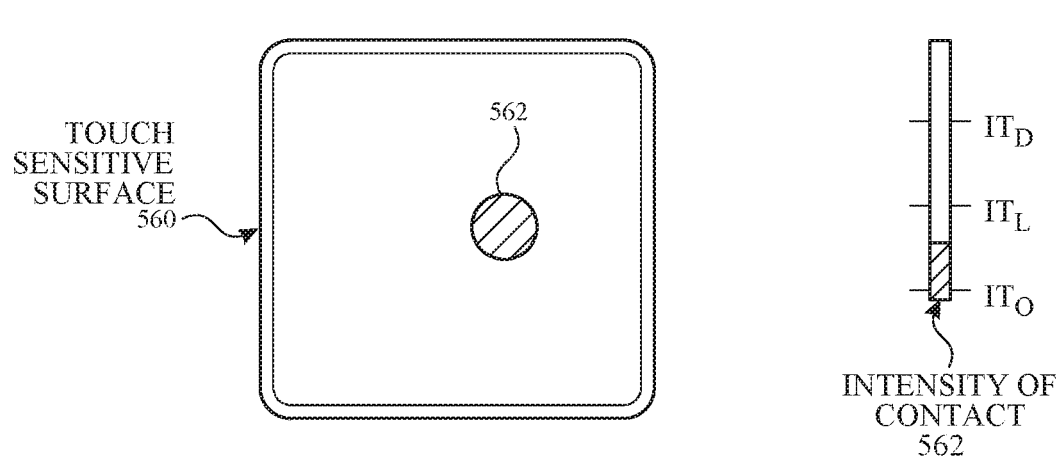
FIG. 5E

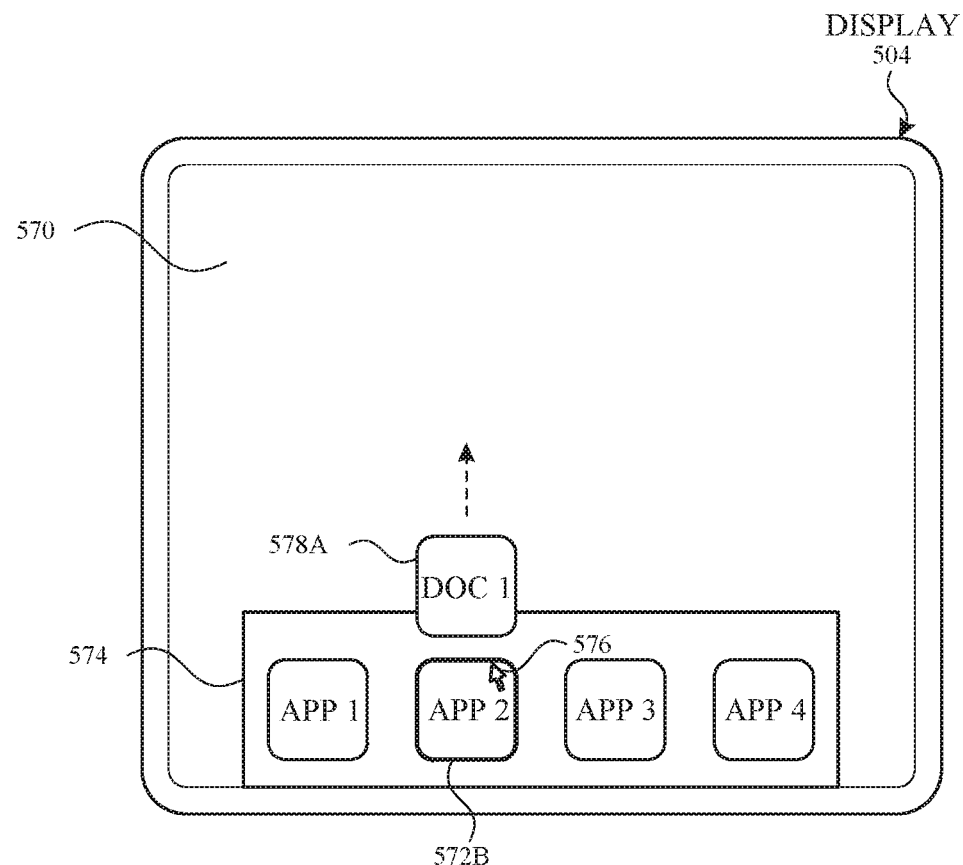
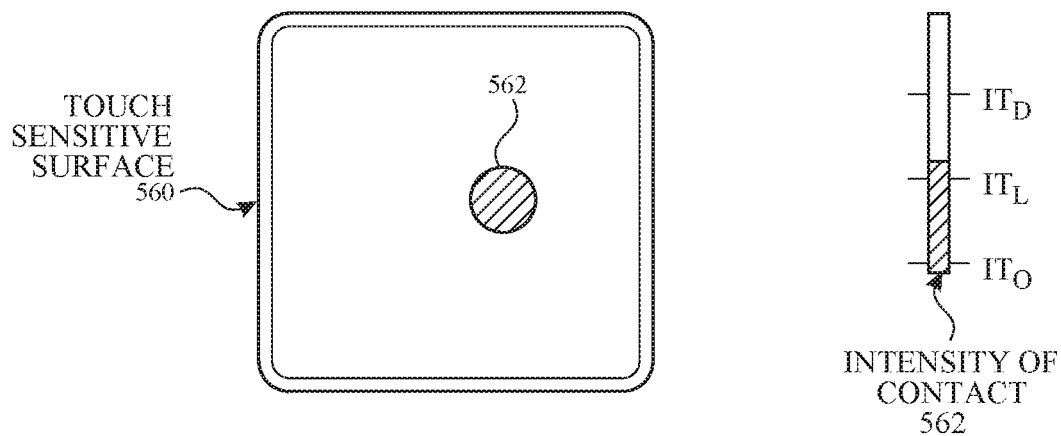
*FIG. 5F*

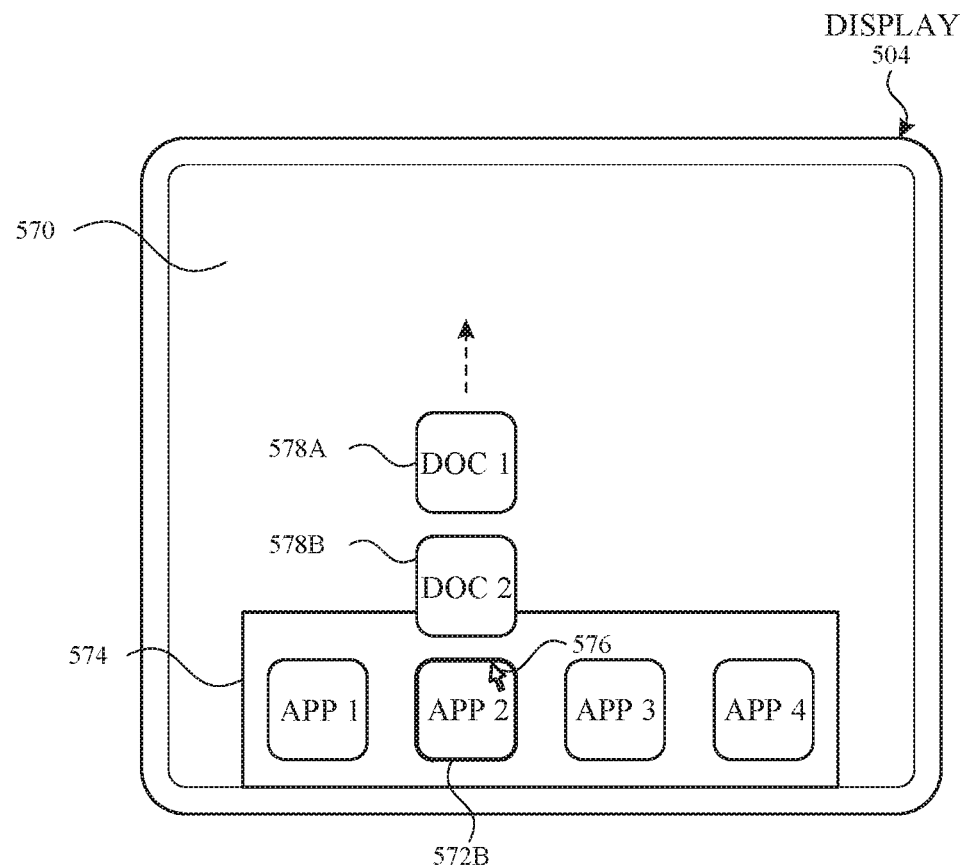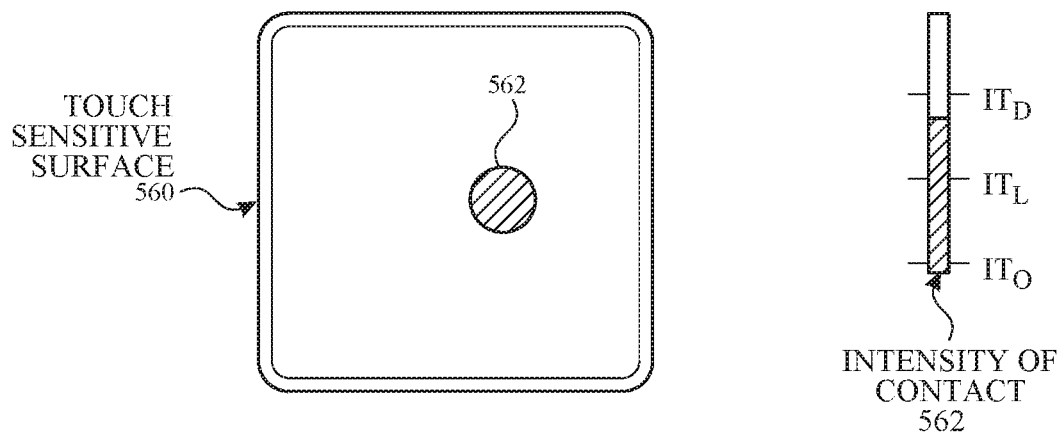
*FIG. 5G*

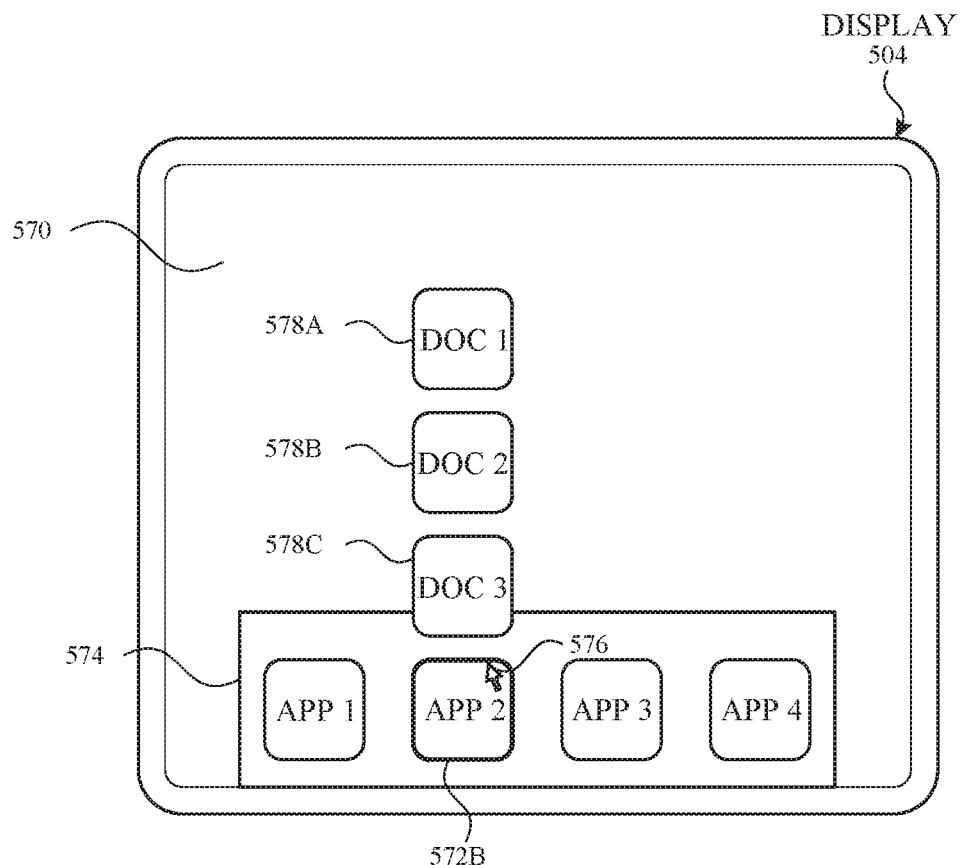
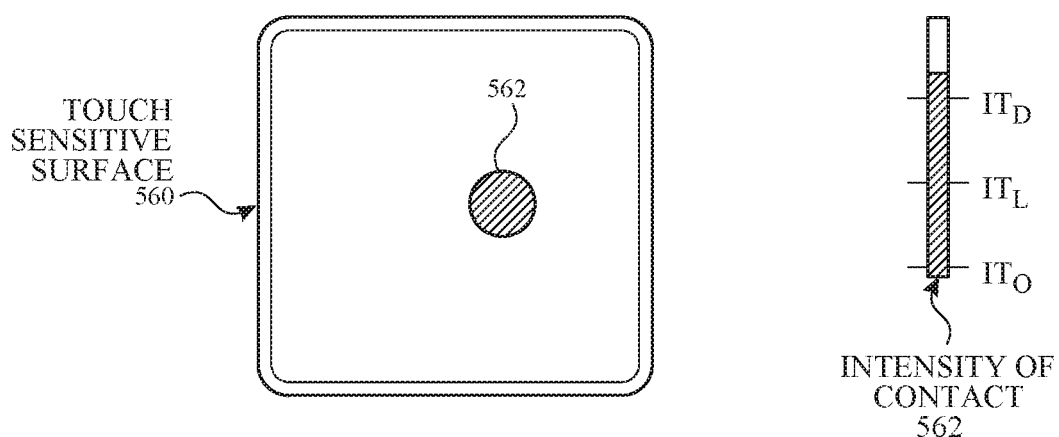
FIG. 5H

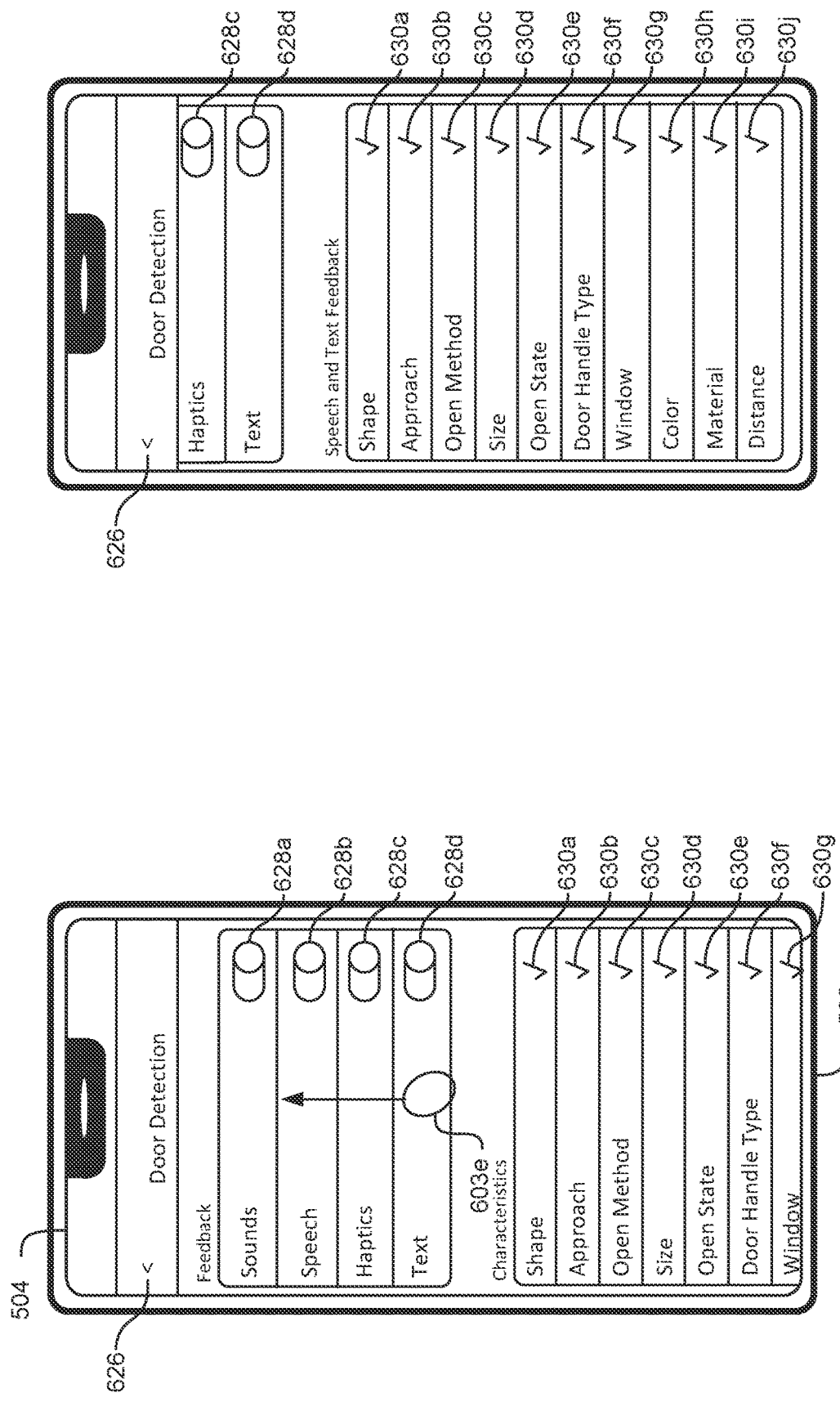

USER INTERFACES FOR DETECTING OBJECTS

CROSS-REFERENCE TO RELATED APPLICATIONS

This application claims the benefit of U.S. Provisional Application No. 63/364,877, filed May 17, 2022, the contents of which are incorporated herein by reference in its entirety for all purposes.

FIELD OF THE DISCLOSURE

This relates generally to user interfaces associated with detecting and indicating characteristics of physical objects.

BACKGROUND OF THE DISCLOSURE

User interaction with computer system has increased significantly in recent years. These devices can be devices such as computers, tablet computers, televisions, multimedia devices, mobile devices, and the like.

In some circumstances, users may wish to use such devices to detect objects. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to one or more computer systems that detect and present indications of characteristics of physical objects. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.

FIGS. 6A-6H illustrate exemplary ways of detecting and presenting indications of characteristics of physical objects in accordance with some embodiments of the disclosure.

DETAILED DESCRIPTION

Figure 1A:
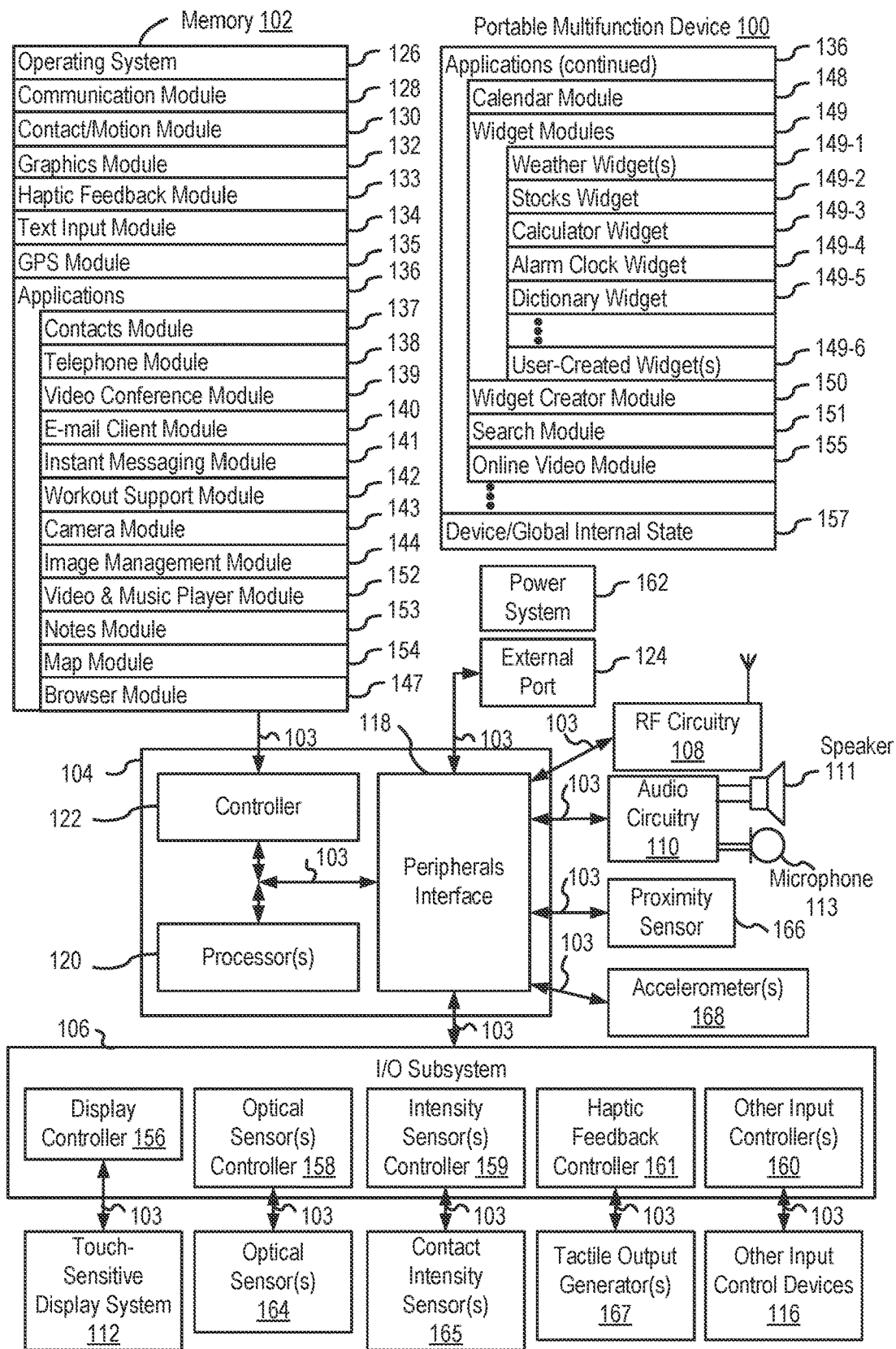
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for computer systems (e.g., electronic devices) to detect objects and present indications of characteristics of the objects. Such techniques can reduce the cognitive burden on a user who uses such devices and/or wishes to control their use of such devices, and such technique can provide enhanced privacy or security. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of computer systems, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. In some embodiments, the computer system is tablet, phone, laptop, desktop, a head mounted display ("HMD"), device with a mechanical wheelbase, self-propelled device, smart speaker, personal assistive device, robot, and/or camera. In some embodiments, the computer system is an electronic device. It should also be understood that, in some embodiments, the device is not a portable communications device, but is a desktop computer with a touch-sensitive surface (e.g., a touch screen display and/or a touchpad).

In the discussion that follows, a computer system that includes a display and a touch-sensitive surface is described. It should be understood, however, that the computer system optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
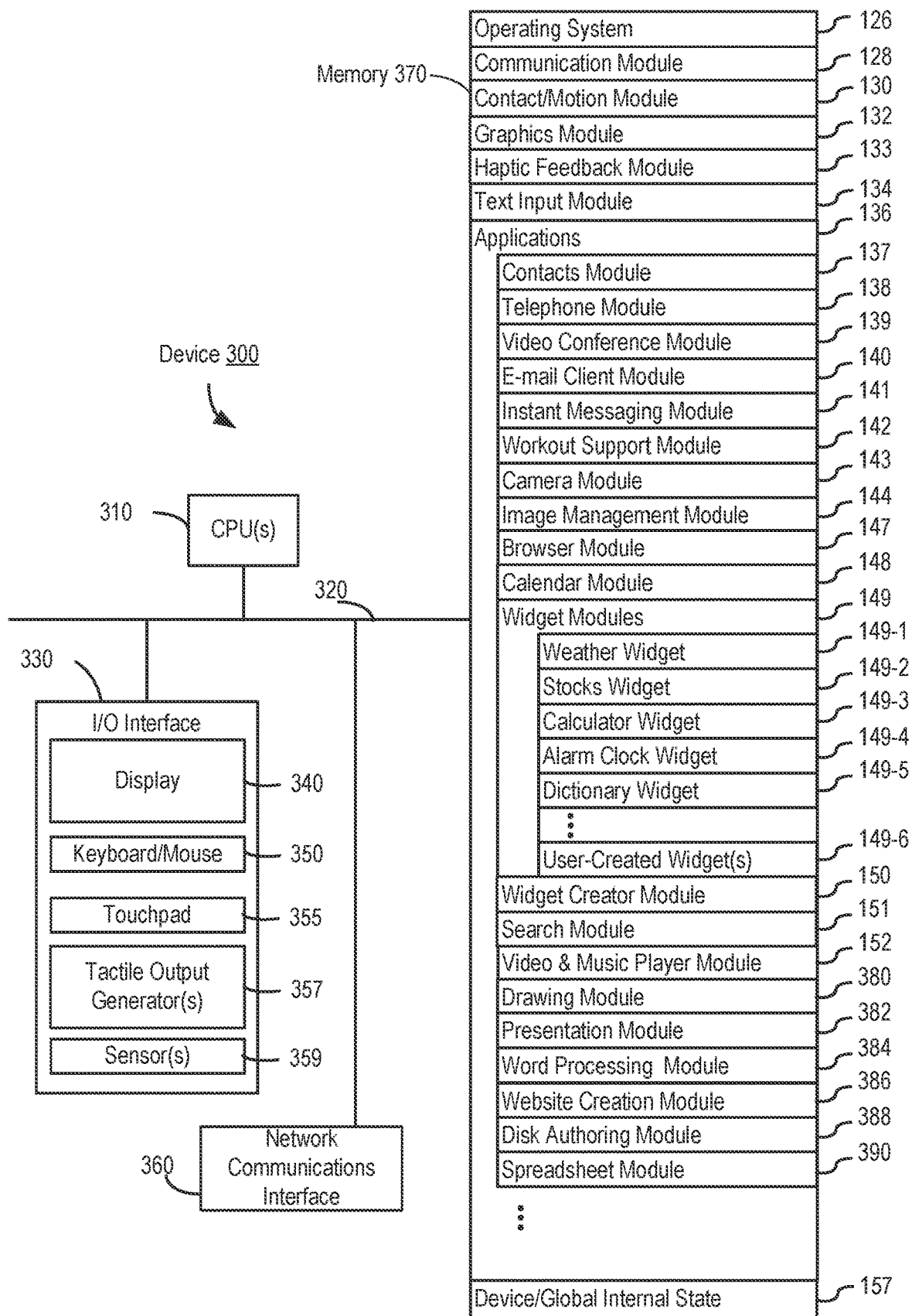
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail module client 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail module client 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
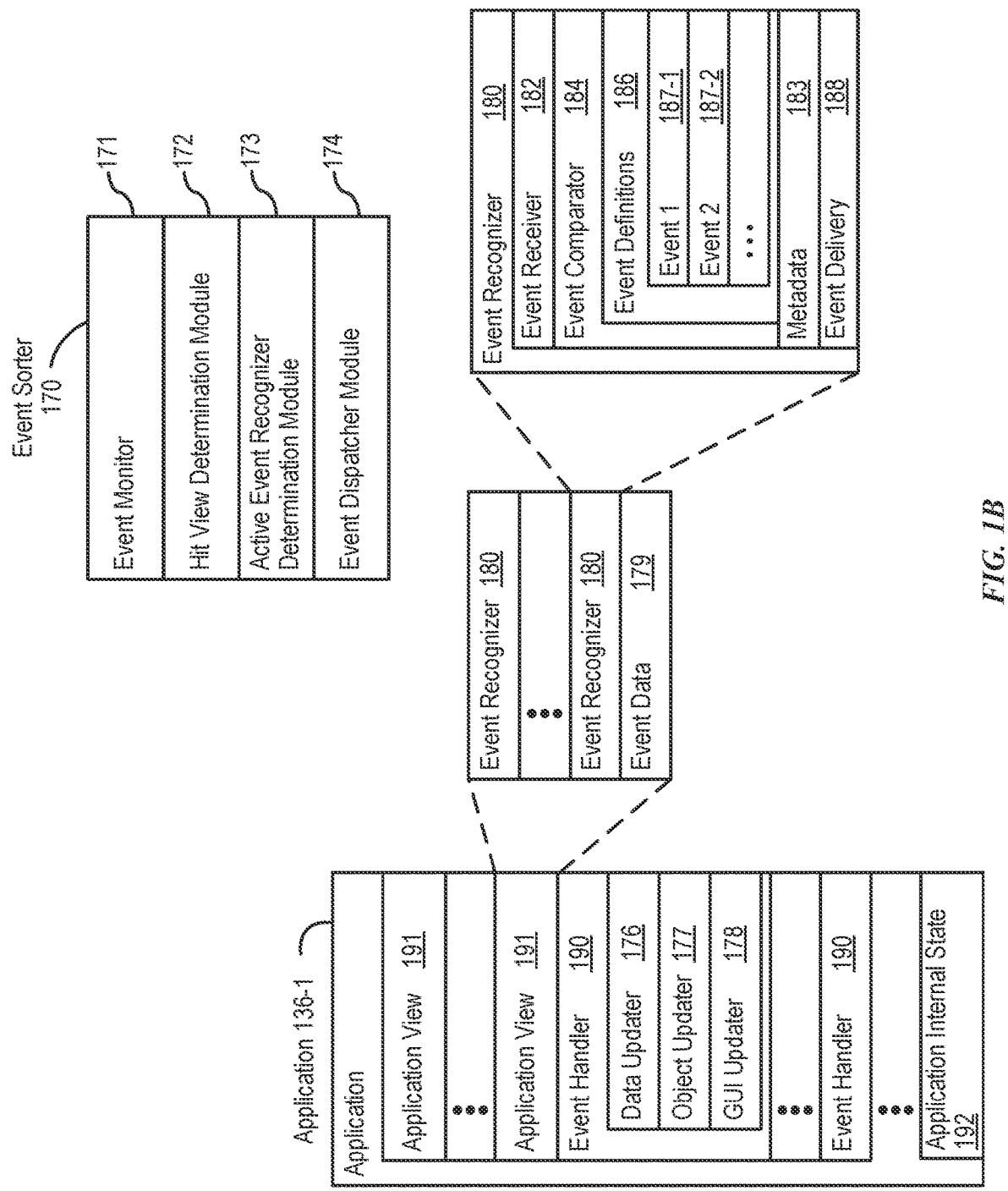
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
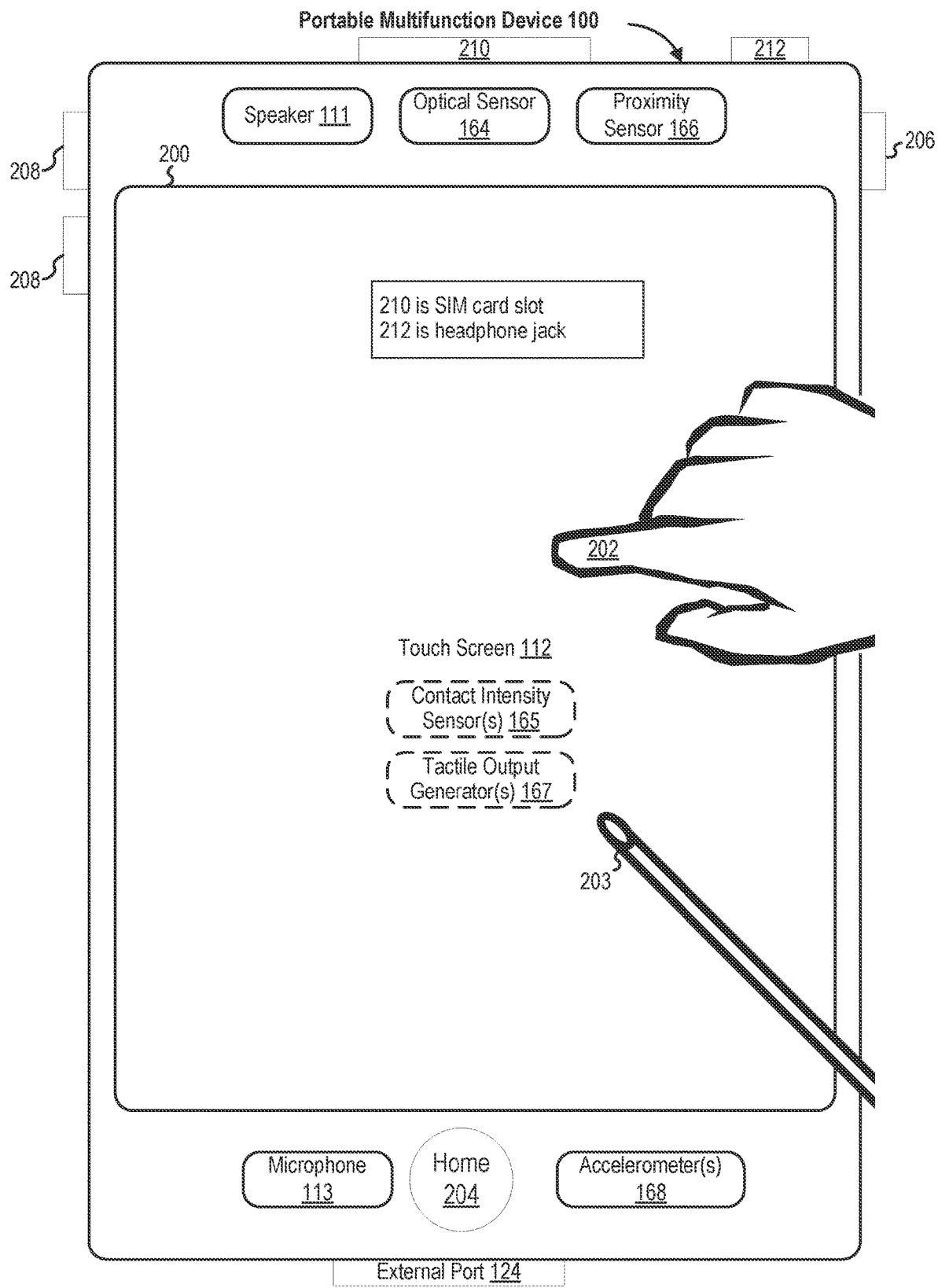
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
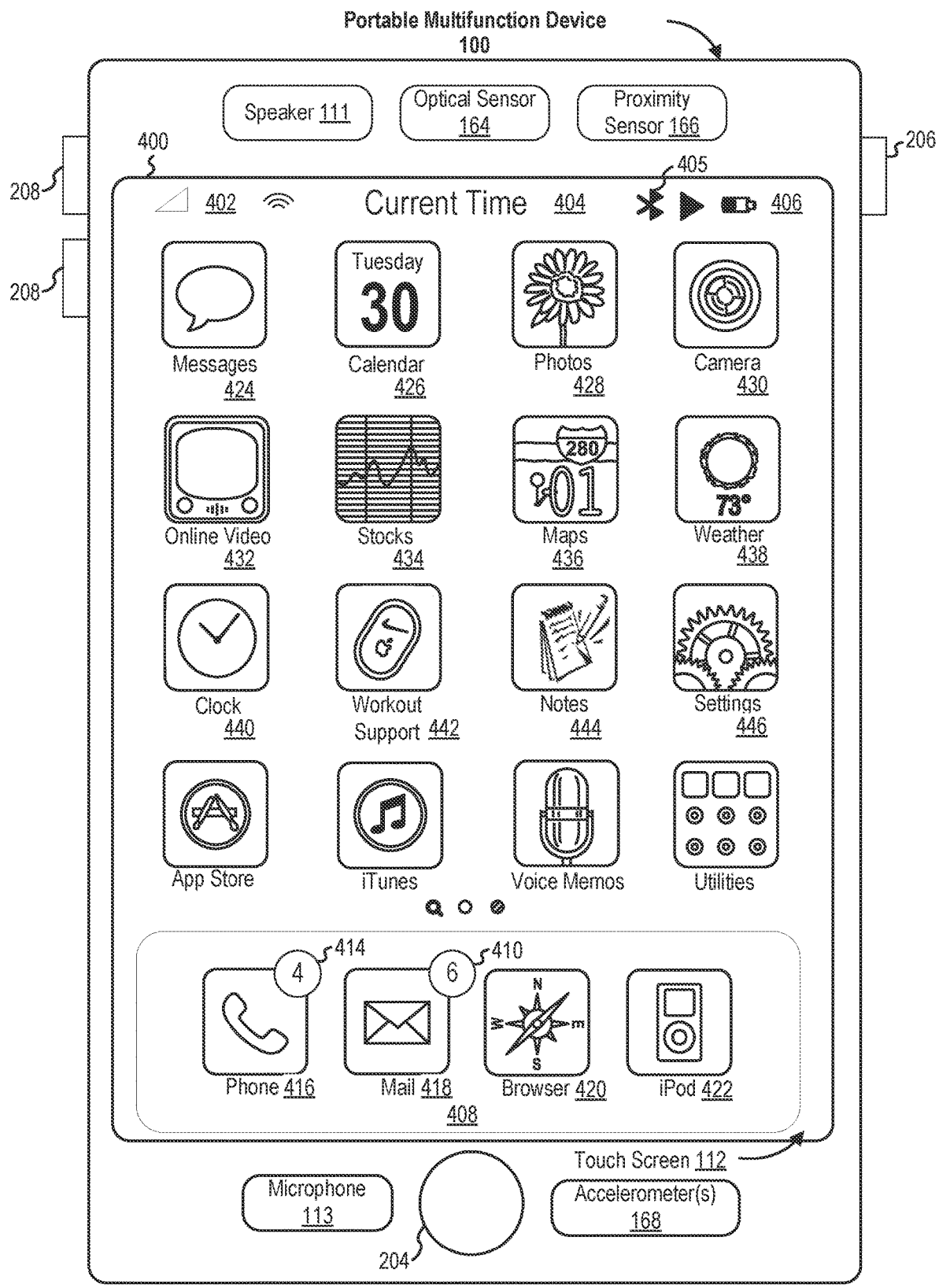
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
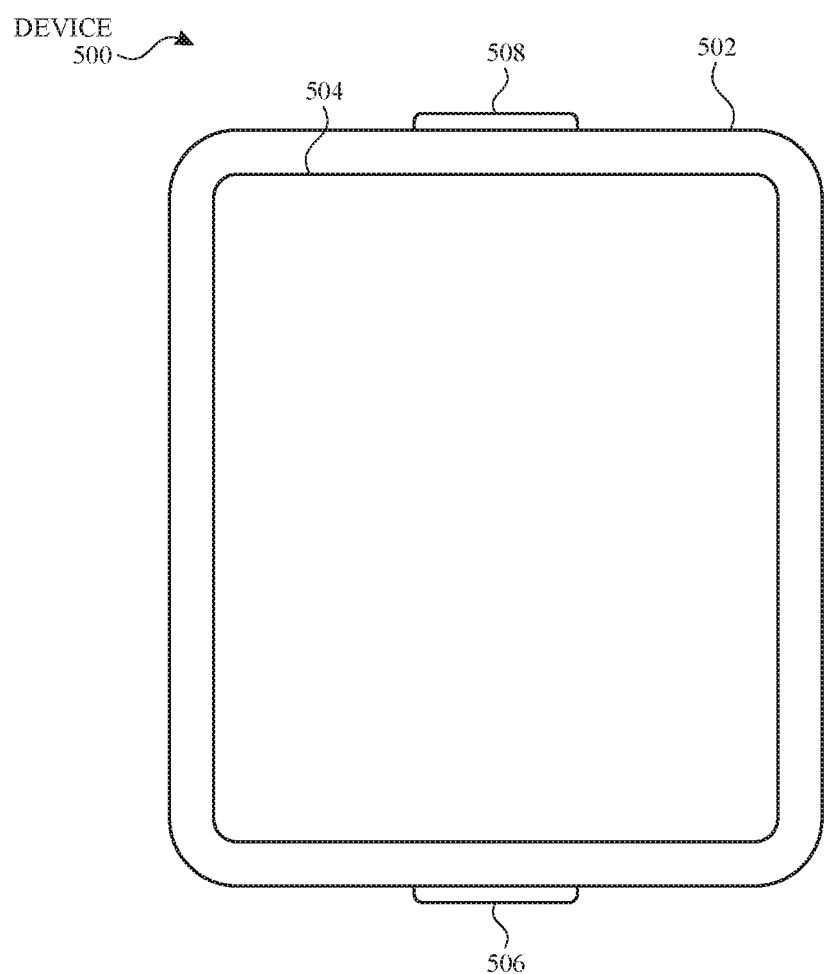
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
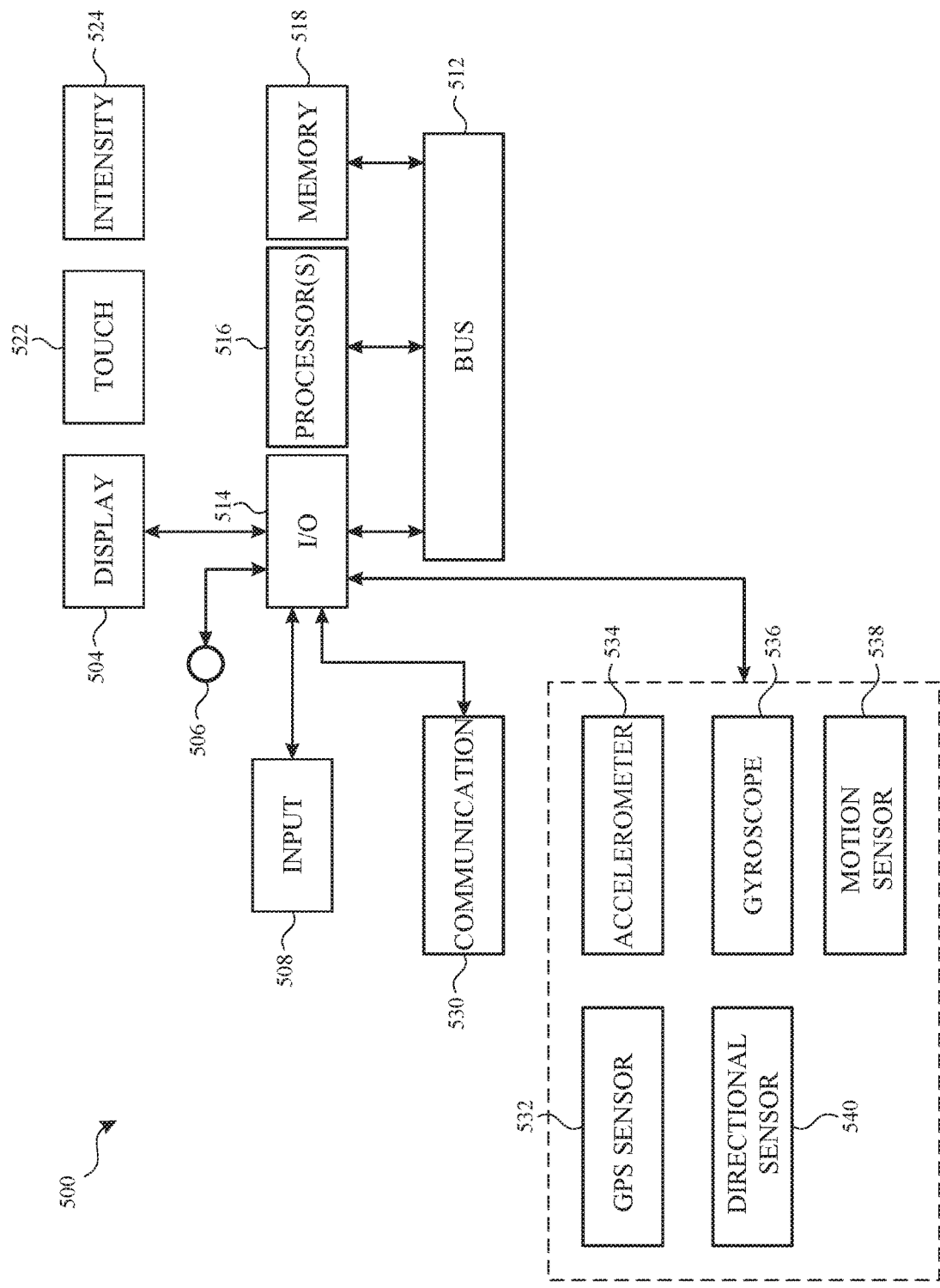
FIG. 5B is a block diagram illustrating a personal electronic device in accordance with some embodiments.
Figure 51:
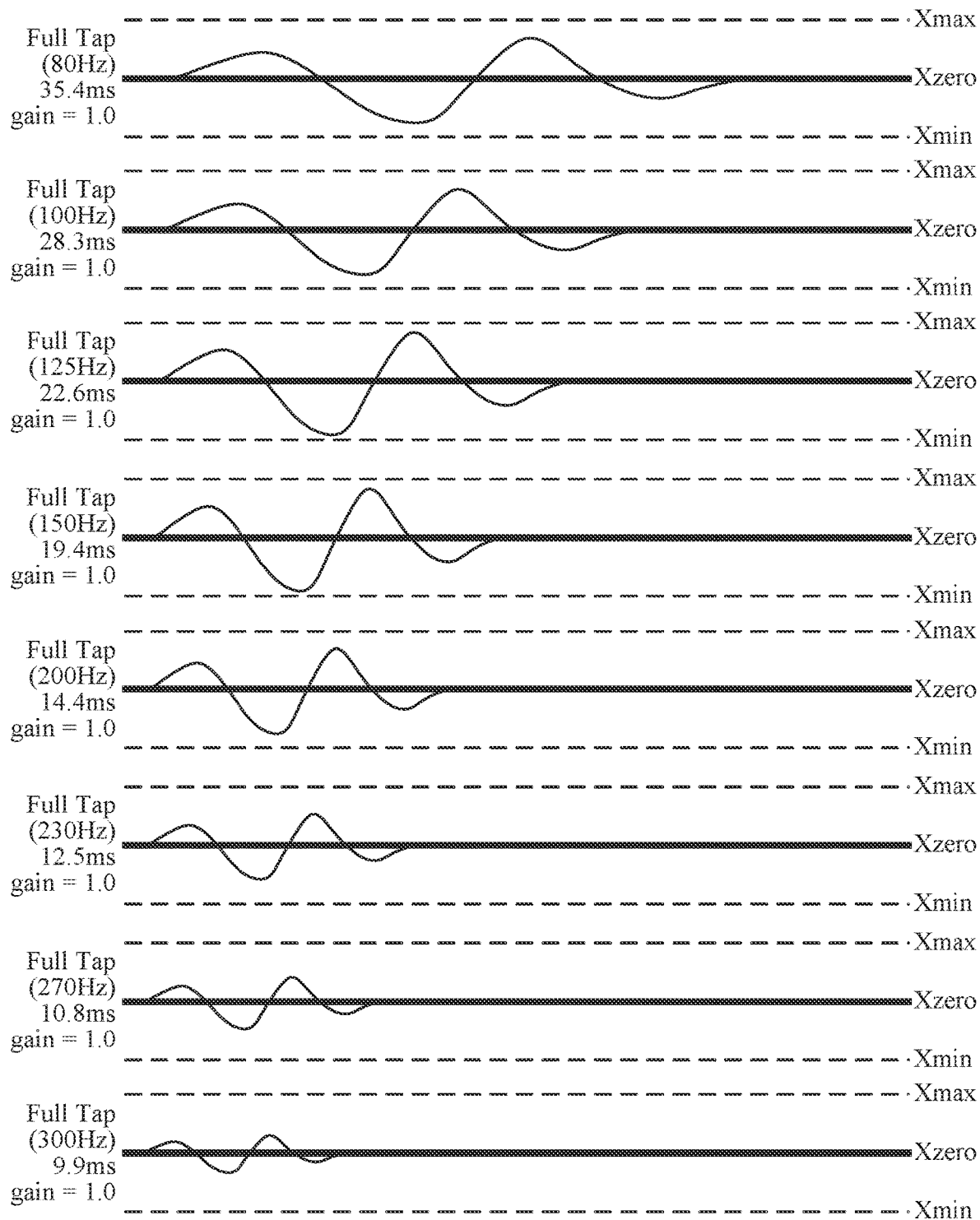

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
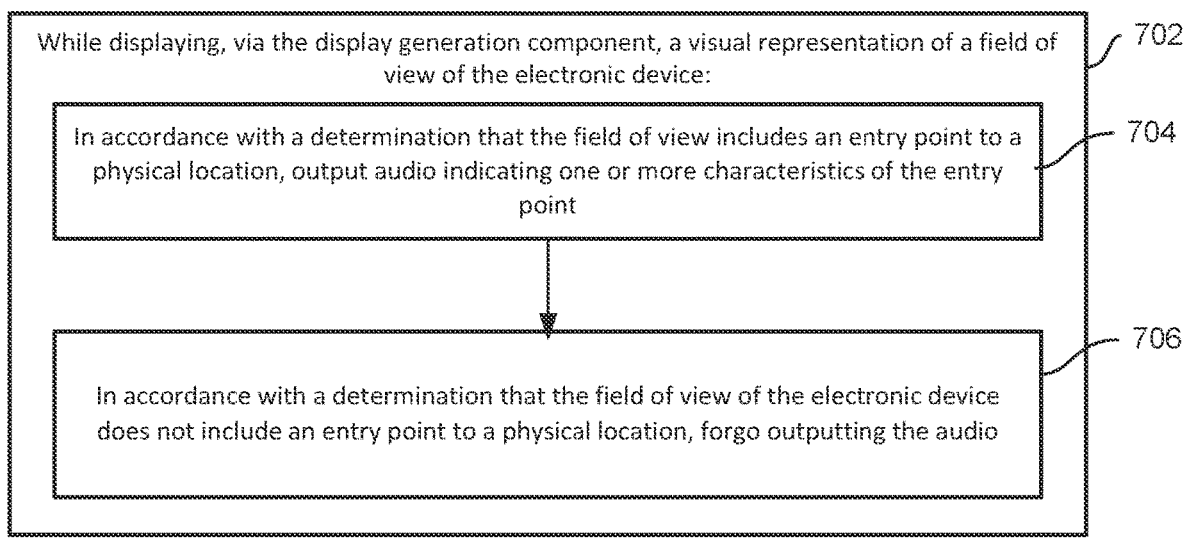
FIG. 7 is a flow diagram illustrating a method of detecting and presenting indications of characteristics of physical objects in accordance with some embodiments of the disclosure.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using a computer system similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, computer system 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5J:
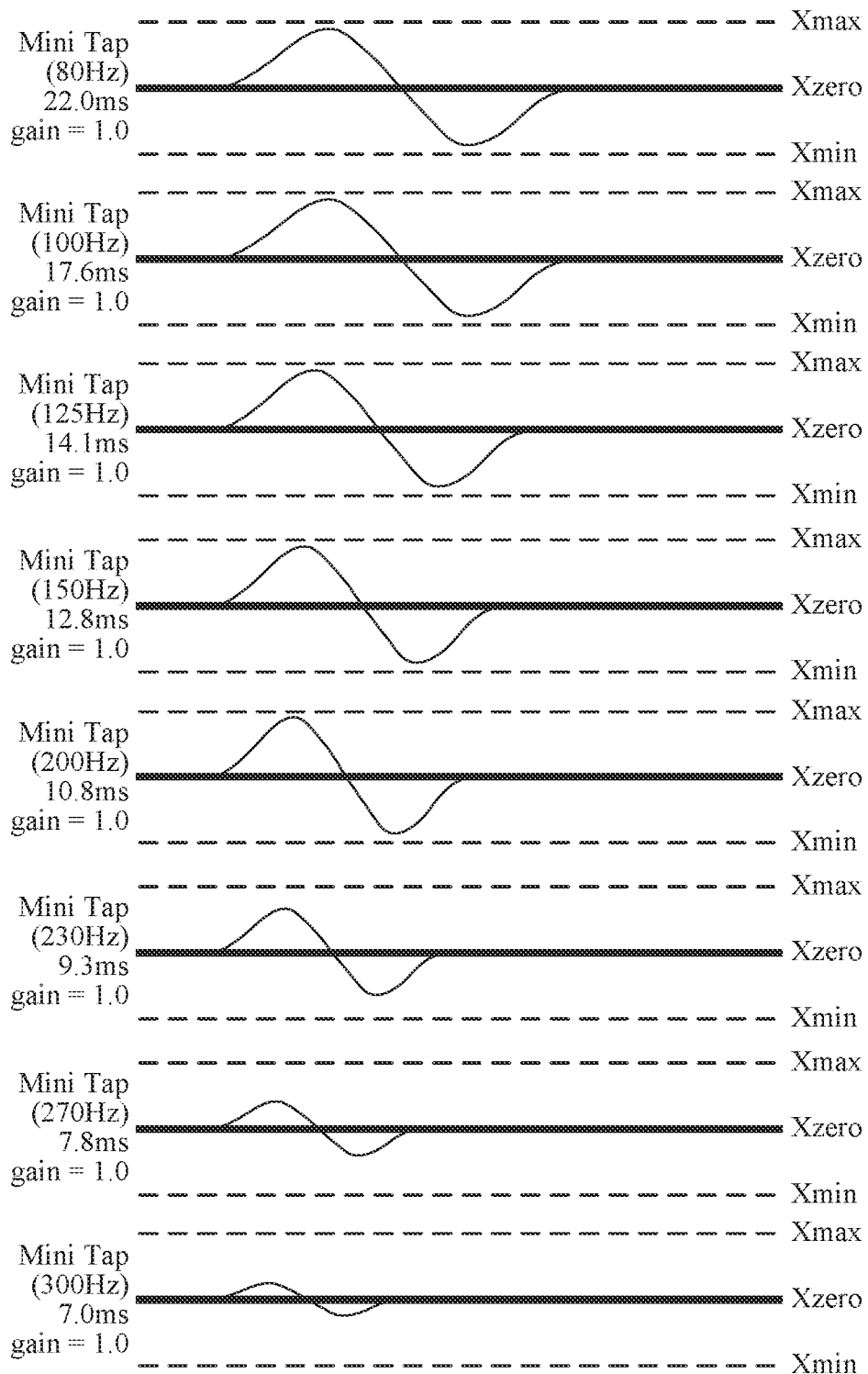
Figure 5K:
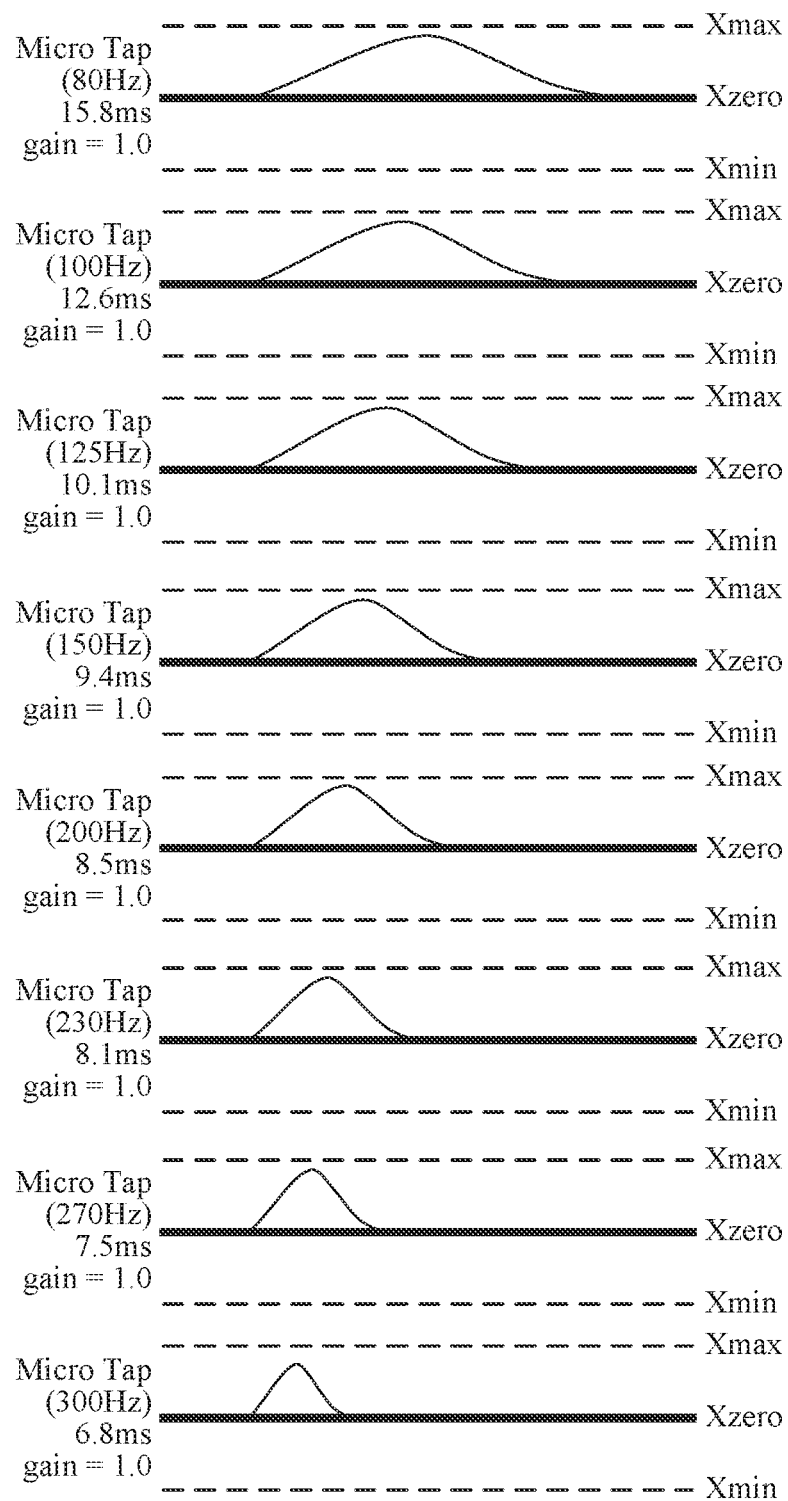
Figure 5L:
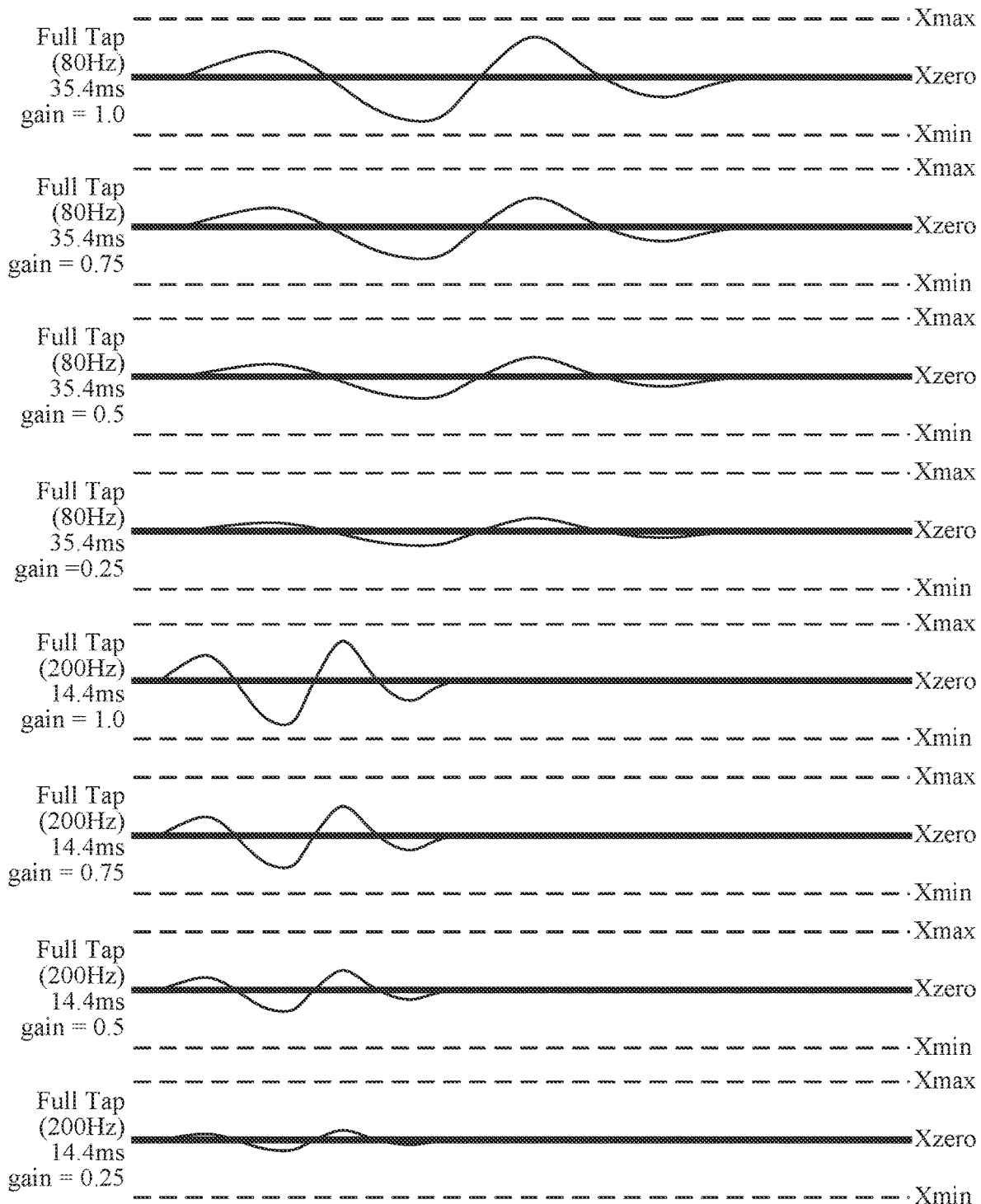
Figure 5M:
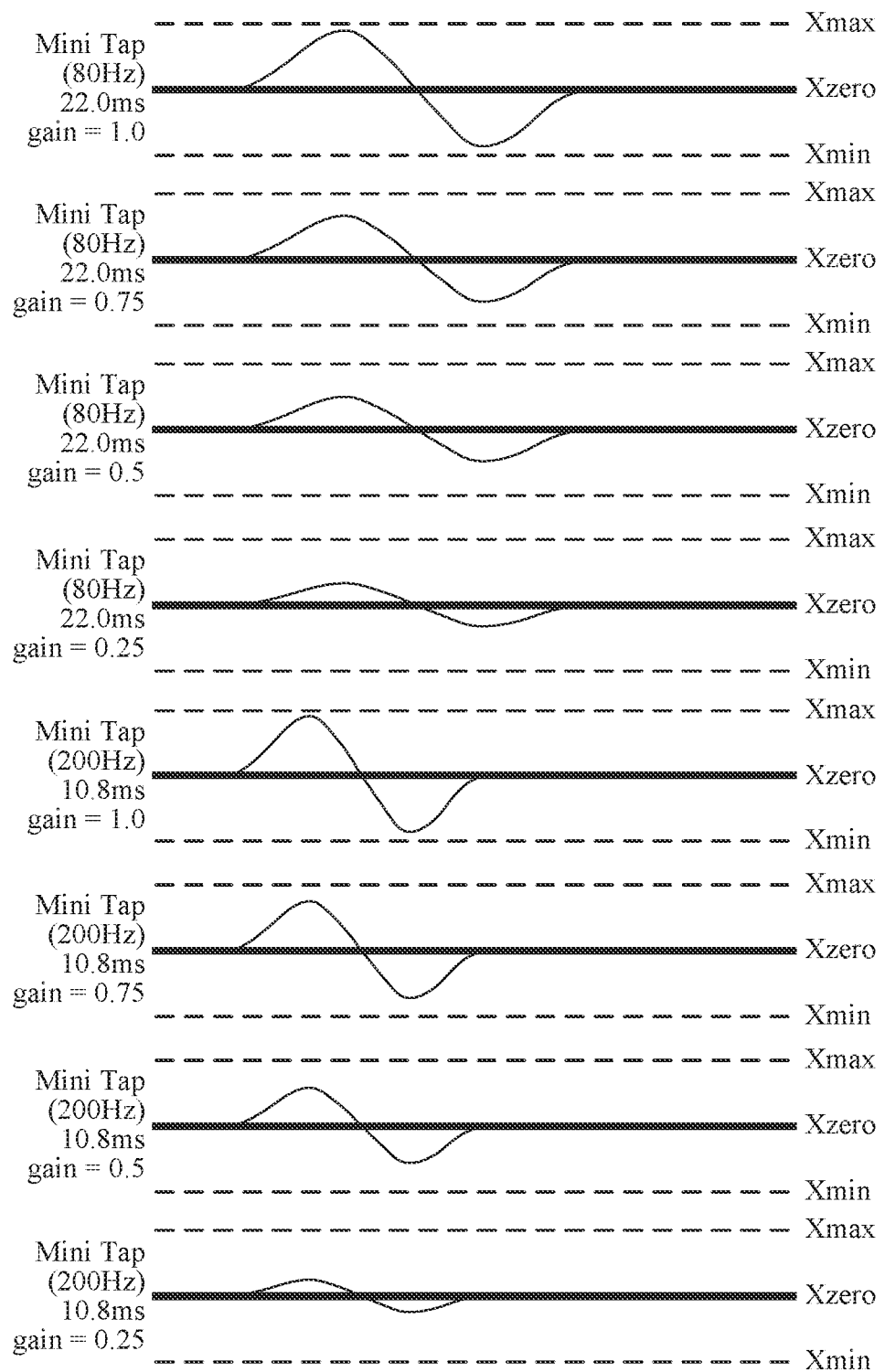
Figure 5N:
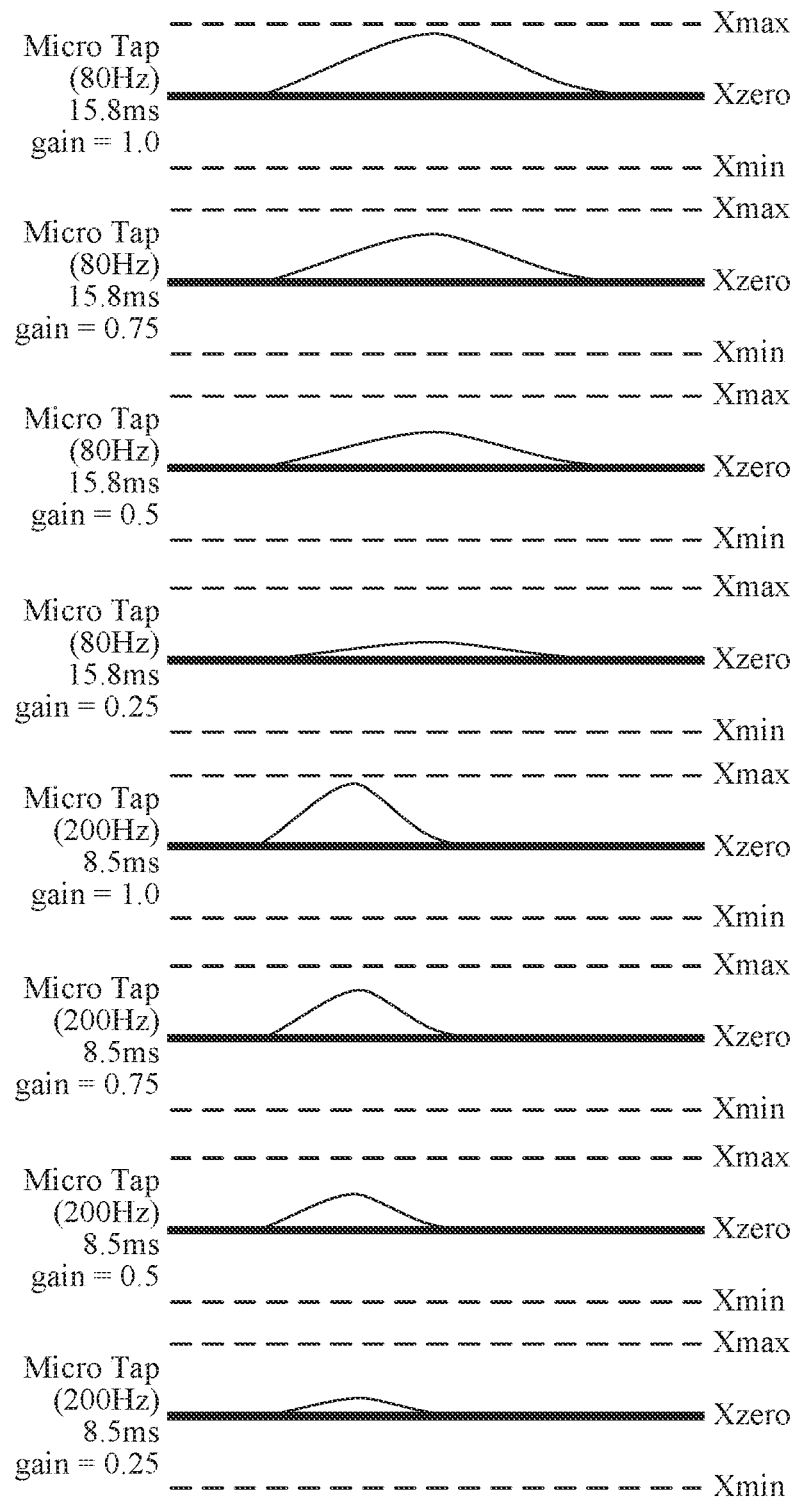

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Nz, and 200 Hz).

FIGS. 5I-5N show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5I-5N include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5I-5N describe movement of a mass in one dimension, however similar principles would also apply to movement of a moveable mass in two or three dimensions.

As shown in FIGS. 5I-5K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5I-5N, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5I). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 5I-5K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 below provides representative examples of tactile output/haptic feedback behaviors and configurations, and examples of their use with respect to the user interfaces for managing content-based tactile outputs that are illustrated and described herein.

TABLE 1

| Type of Tactile Output Sequence | Waveform | Textural (continuous) or Discrete |
|---|---|---|
| "Major" | MiniTap at 180 Hz | Discrete |
| "Minor" | MicroTap at 80 Hz | Textural |
| "Major-reduced" | MiniTap at 200 Hz | Discrete |
| "Minor-Reduced" | MicroTap at 200 Hz | Discrete |

As used herein, an "installed application" refers to a software application that has been downloaded onto an computer system (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

USER INTERFACES AND ASSOCIATED PROCESSES

Detecting and Presenting Indications of Objects

Users interact with computer systems (e.g., electronic devices) in many different manners. In some embodiments, a computer system detects physical objects in the environment of the electronic device. The embodiments described below provide ways in which a computer system detects and presents indications of characteristics of physical objects. Enhancing interactions with a device reduces the amount of time needed by a user to perform operations, and thus reduces the power usage of the device and increases battery life for battery-powered devices. The ability for a user account to receive indications of characteristics of objects is intended to be used by users to understand their physical environment with the assistance of electronic devices. It is understood that people use devices. When a person uses a device, that person is optionally referred to as a user of the device.

FIGS. 6A-6H illustrate exemplary ways of detecting and presenting indications of characteristics of physical objects in accordance with some embodiments of the disclosure. The embodiments in these figures are used to illustrate the processes described below, including the processes described with reference to FIG. 7. In some implementations, the features of detecting and presenting indications of characteristics of physical objects are part of a magnifier application on an electronic device. These features may be enabled (or disabled) by switching on a "detection mode" in the settings of computer system or in the settings of the magnifier application itself.

Figure 6B:
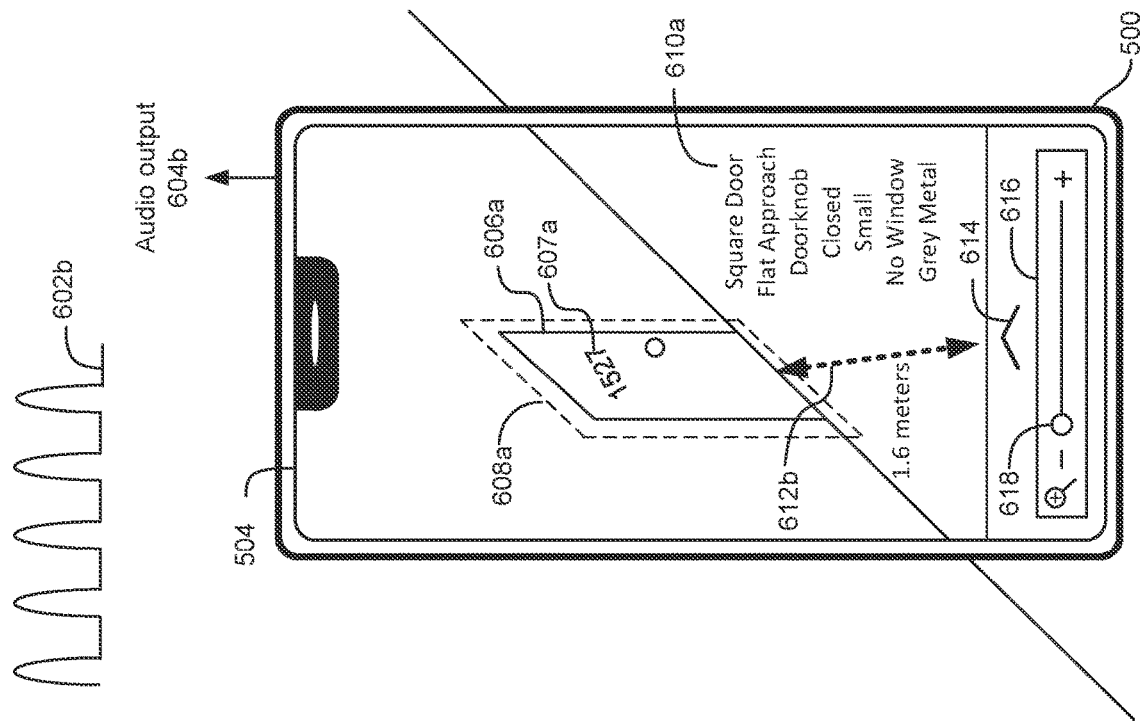
Figure 6A:
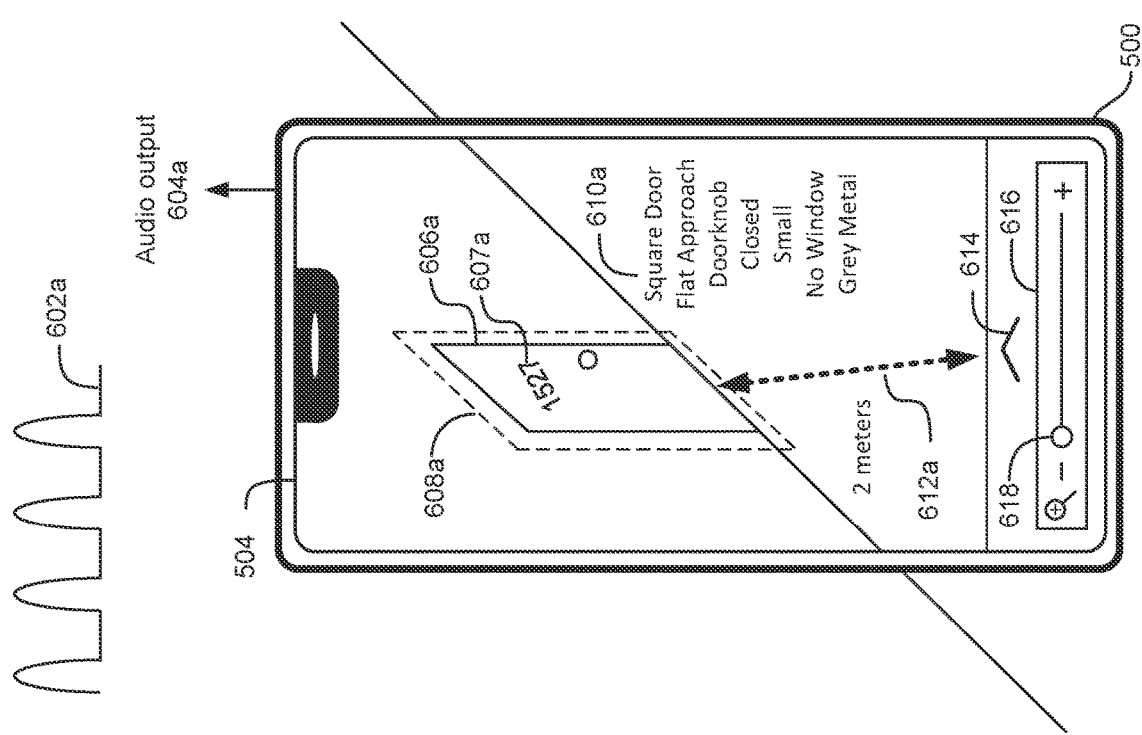

FIG. 6A illustrates an example computer system 500 including a touch screen 504. In FIG. 6A, the computer system 500 presents an image that includes an entry point 606a to a physical location in the physical environment of the computer system 500. For example, entry point 606a is a door of a building. In some embodiments, the techniques described herein apply to other types of entry points described in more detail below in the description of method 700. In some embodiments, the image of the entry point 606a is a real-time video feed captured by a computer system (e.g., using a camera or LiDAR scanner in communication with and/or integrated with computer system 500). In some embodiments, the image of the entry point 606a is a previously-captured still or video image. As shown in FIG. 6A, the computer system 500 displays an AR (augmented reality) outline 608a around the entry point 606a. In some embodiments, the user interface including the image of the entry point 606a further includes a slider 616 user interface element that, in response to detecting movement of indicator 618, causes the computer system 500 to adjust a level of zoom of the image displayed in the user interface and a selectable option 614 that, when selected, causes the computer system 500 to display additional selectable options related to the user interface, including an option to display a settings user interface for adjusting settings related to the user interface, such as the settings user interface illustrated in FIGS. 6F-6H.

In some embodiments, in response to detecting the entry point 606a in the image, the computer system 500 presents indications of characteristics of the entry point 606a. For example, the computer system 500 displays an indication 612a of the distance between the entry point 606a in the environment of the computer system 500 and the computer system 500. In some embodiments, the computer system 500 determines the distance between the computer system 500 and the entry point 606a using a range sensor, depth sensor, LiDAR, or a similar sensor. As another example, the computer system 500 displays an indication 610a of characteristics of the entry point 606a, such as the shape of the entry point (e.g., "square door"), the type of approach of the entry point 606a (e.g., "flat approach"), the method of opening the entry point 606a (e.g., "doorknob"), the open state of the entry point 606a (e.g., "closed"), the size of the entry point (e.g., "small"), whether or not the entry point 606a includes a window (e.g., "no window"), and the color and material of the entry point 606a (e.g., "grey metal").

In some embodiments, the computer system 500 presents a spoken audio output 604a that includes the characteristics included in indication 610a, a spoken indication of the distance between the entry point 606a and the computer system 500, and a spoken indication of a sign 607a on the entry point 606a. In some embodiments, the spoken indication of the sign 607a on the entry point 606a includes a spoken description of the location of the sign 607a relative to the entry point 606a and the text of the sign 607a. For example, for the entry point 606a in FIG. 6A, the indication 604a includes an indication that the sign 607a reads the text "1527" and that the sign 607a is on the entry point 606a. In some embodiments, if the sign includes symbols, such as restroom sign symbols, the computer system 500 includes a description of the meaning of the symbols in indication 604a. In some embodiments, if the sign is next to the entry point, the computer system 500 describes the sign's location, such as being to the left, to the right, or above the entry point.

Additionally or alternatively, in some embodiments, the computer system 500 presents an additional indication 602a of the distance between the entry point 606a and the computer system 500. In some embodiments, the indication 602a includes audio and/or tactile pulses at intervals that correspond to the distance between the computer system 500 and the entry point 606a described in more detail below in the description of method 700. In some embodiments, tactile pulses include one or more of the tactile output patterns described above with reference to FIGS. 5I-5N.

In some embodiments, the characteristics of the entry point 606a and the types of indications presented are defined by the user of the computer system 500 in a settings user interface, such as the settings user interface described below with reference to FIGS. 6F-6H. Thus, in some embodiments, the characteristics included in the indications and the types of indications presented by the computer system 500 vary from those illustrated in FIGS. 6A-6H.

In some embodiments, while displaying the user interface illustrated in FIG. 6A, the computer system 500 detects movement of the computer system 500 relative to the entry point 606a. In response to detecting a change in distance between the computer system 500 and the entry point 606a, the computer system 500 updates indications 602a, 604a, and/or 612a in accordance with the updated distance between the entry point 606a and the computer system 500, as shown in FIG. 6B for example.

FIG. 6B illustrates the example computer system 500 updating the indications of the entry point 606a in response to the computer system 500 having an updated position relative to the entry point 606a. For example, the computer system 500 is closer to the entry point 606a in FIG. 6B than it was in FIG. 6A. Accordingly, for example, in FIG. 6B, the computer system 500 displays an updated indication 612b of the distance between the entry point 606a and the computer system 500 and updates the period between pulses included in indication 602b. Additionally or alternatively, the computer system 500 updates the audio output 604b to include a spoken indication of the updated distance between the computer system 500 and the entry point 606a.

In some embodiments, when there are multiple entry points in an image, the computer system 500 presents indications of the characteristics of each entry point, one after another, in order from the closest entry point to the computer system 500 to the furthest entry point from the computer system 500. In some embodiments, in response to an input selecting an entry point in the image for which the computer system 500 is not currently presenting characteristics, the computer system 500 presents the characteristics of the selected entry point, even if that means presenting characteristics of the entry points in an order other than from the closest entry point to the computer system 500 to the furthest entry point from the computer system 500.

Figure 6D:
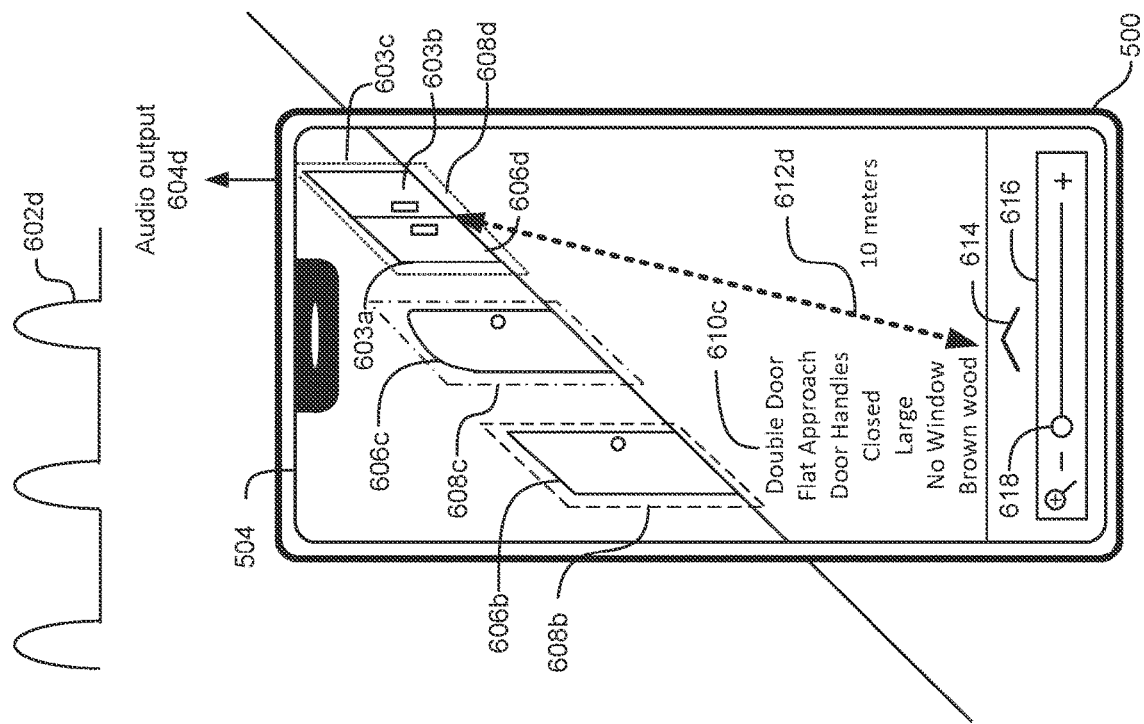
Figure 6C:
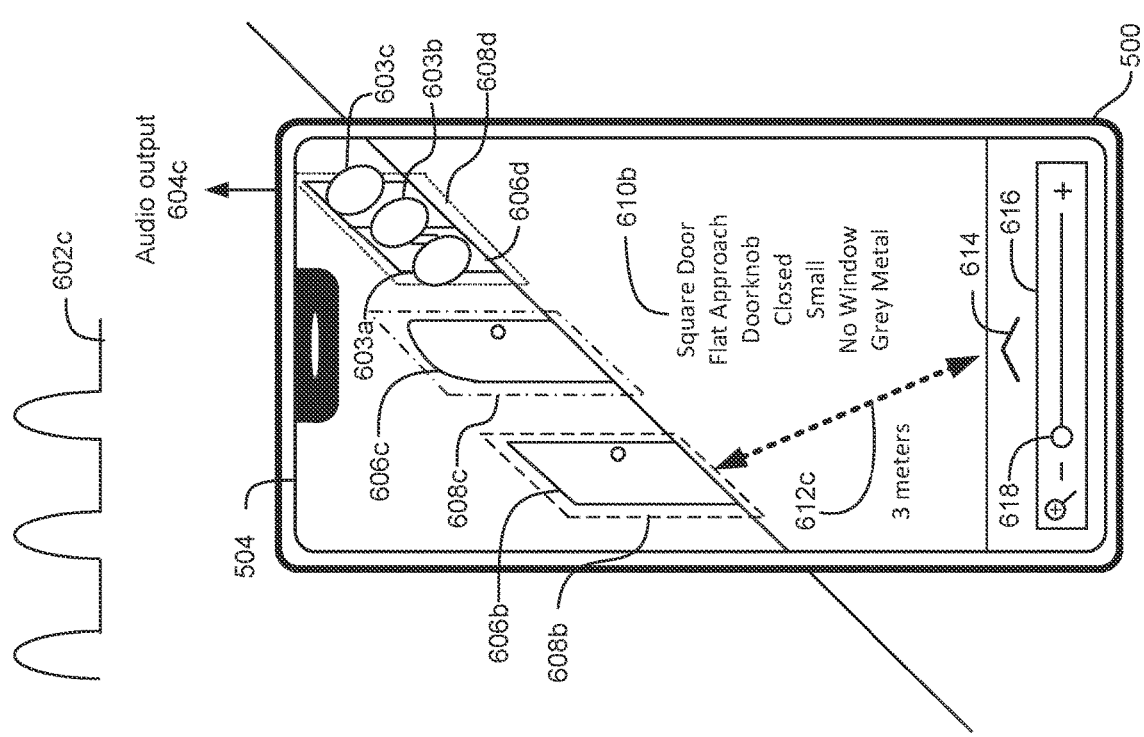

FIG. 6C illustrates an example of the computer system 500 displaying an image including three entry points 606b, 606c, and 606d. For example, the entry points 606b, 606c, and 606d are entry points in the physical environment of the computer system 500. In some embodiments, the computer system 500 presents outlining 608b, 608c, and 608d around entry points 606b, 606c, and 606d, respectively. In some embodiments, the outlining 608b around the entry point 606b that is closest to the computer system 500 has the highest level of visual prominence (e.g., darkest color, thickest line, and/or brightest glow) compared to the other outlines 608c and 608d and the outlining 608d around the entry point 606d that is furthest from the computer system 500 has the lowest level of visual prominence (e.g., lightest color, thinnest line, and/or dimmest glow) compared to the other outlines 608b and 608c.

As shown in FIG. 6C, the computer system 500 presents indications of the characteristics of the entry point 606b that is closest to the computer system 500 first, unless the computer system 500 receives an input corresponding to a request to present indications of characteristics of one of the other entry points 606c or 606d. The indications optionally include a visual indication 610*b* of characteristics of the entry point 606*b*, a visual indication 612*c* of the distance between the entry point 606*b* and the computer system 500, an audio output 604*c* including spoken indications of the characteristics of the entry point 606*b* included in indication 610*b* and/or the distance between the entry point 606*b* and the computer system 500, and audio and/or tactile pulses 602*c* corresponding to the distance between the computer system 500 and the entry point 606*b*. In some embodiments, these indications have one or more characteristics in common with the indications described above with reference to FIGS. 6A-6B.

For example, visual indication 610*b* includes text that indicates the shape of the entry point 606*b* (e.g., "square door"), the type of approach of the entry point 606*b* (e.g., "flat approach"), the method of opening the entry point 606*b* (e.g., "doorknob"), the open state of the entry point 606*b* (e.g., "closed"), the size of the entry point (e.g., "small"), whether or not the entry point 606*b* includes a window (e.g., "no window"), and the color and material of the entry point 606*b* (e.g., "grey metal"). In some embodiments, the computer system 500 displays an indication 612*c* of the distance between the computer system 500 and the entry point 606*b*. In some embodiments, the audio and/or tactile pulses 602*c* are presented with periods between pulses that corresponds to the distance between the computer system 500 and the entry point 606*b*. In some embodiments, the audio output 604*c* includes spoken audio indicating one or more characteristics included in indication 610*b* and/or the distance between the computer system 500 and the entry point 606*b*.

In some embodiments, if the computer system 500 does not receive an input corresponding to a request to present indications of characteristics of an entry point other than entry point 606*c*, which is the next-closest entry point to the computer system 500 after entry point 606*b*, the computer system 500 will present an audio indication similar to audio indication 504*c* of characteristics of entry point 606*c* after finishing presenting audio indication 604*c* of characteristics of entry point 606*b*. In FIG. 6C, the computer system 500 detects an input (e.g., including contacts 603*a*, 603*b*, and 603*c* on touch screen 504) corresponding to selection of entry point 606*c*. In some embodiments, the input is secondary selection of the entry point 606*c* using an accessibility feature of the computer system 500 that causes the computer system 500 to present an audio output including a spoken description of the element to which the secondary selection is directed. For example, in response to detecting the input in FIG. 6C, the computer system 500 presents indications of characteristics of entry point 606*c* as shown in FIG. 6D.

FIG. 6D illustrates the computer system 500 presenting indications of characteristics of entry point 606*d* in response to the input illustrated in FIG. 6C. In some embodiments, the computer system 500 presents an audio output 604*d* including spoken audio with characteristics of the entry point 606*d*, such as the shape of the entry point 606*d*, the approach to the entry point 606*d*, the type of opening mechanism of the entry point 606*d*, the open/closed state of the entry point 606*d*, the size of the entry point 606*d*, whether or not the entry point 606*d* has a window, the color of the entry point 606*d*, the material of the entry point 660*d*, and/or the distance between the computer system 500 and the entry point 606*d*. In some embodiments, the computer system 500 presents the audio output 604*d* corresponding to entry point 606*d* while maintaining presentation of visual indication 612*c* of the distance between the entry point 606*b*, the visual indication 610*b* of characteristics of the entry point 606*b*, and/or the audio and/or tactile pulses 602*c* corresponding to the distance between the entry point 606*b* and the computer system 500.

In some embodiments, as shown in FIG. 6D, the computer system 500 presents a visual indication 610*c* of characteristics of the entry point 606*d*, a visual indication 612*d* of the distance between the computer system 500 and the entry point 606*d*, and/or the audio and/or tactile pulses 602*d* corresponding to the distance between entry point 606*d* and the computer system 500 in response to the input illustrated in FIG. 6C. For example, indication 610*c* includes text that indicates the shape of the entry point 606*d* (e.g., "double door"), the type of approach of the entry point 606*d* (e.g., "flat approach"), the method of opening the entry point 606*d* (e.g., "door handles"), the open state of the entry point 606*d* (e.g., "closed"), the size of the entry point 606*d* (e.g., "large"), whether or not the entry point 606*d* includes a window (e.g., "no window"), and the color and material of the entry point 606*d* (e.g., "brown wood"). In some embodiments, after presenting the indications 602*d*, 604*d*, 610*c*, and/or 612*d* corresponding to entry point 606*d*, the computer system 500 presents similar indications corresponding to entry point 606*c*.

In some embodiments, the computer system 500 detects objects other than entry points in the environment of the computer system 500. For example, the computer system 500 additionally or alternatively detects people in the environment of the computer system 500. In some embodiments, the electronic device concurrently detects entry points and people.

Figure 6F:
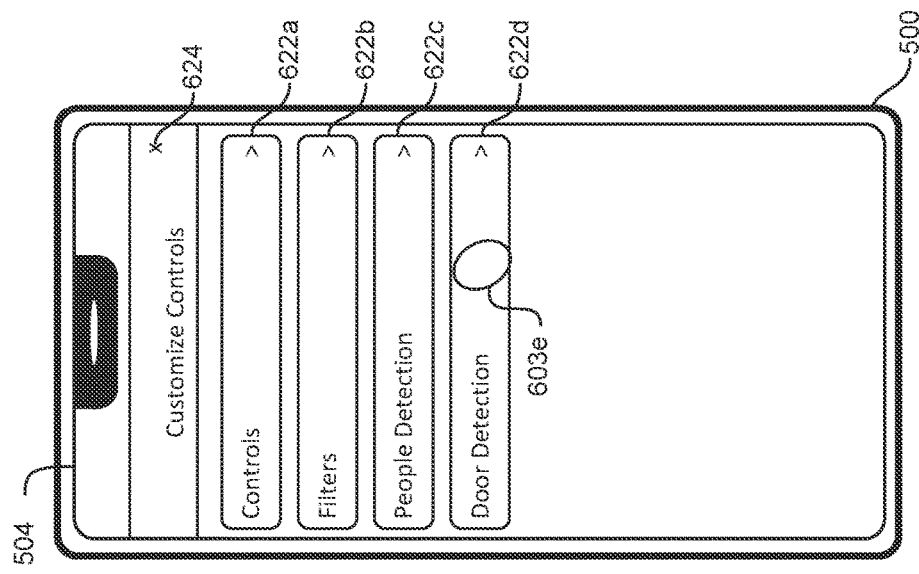
Figure 6E:
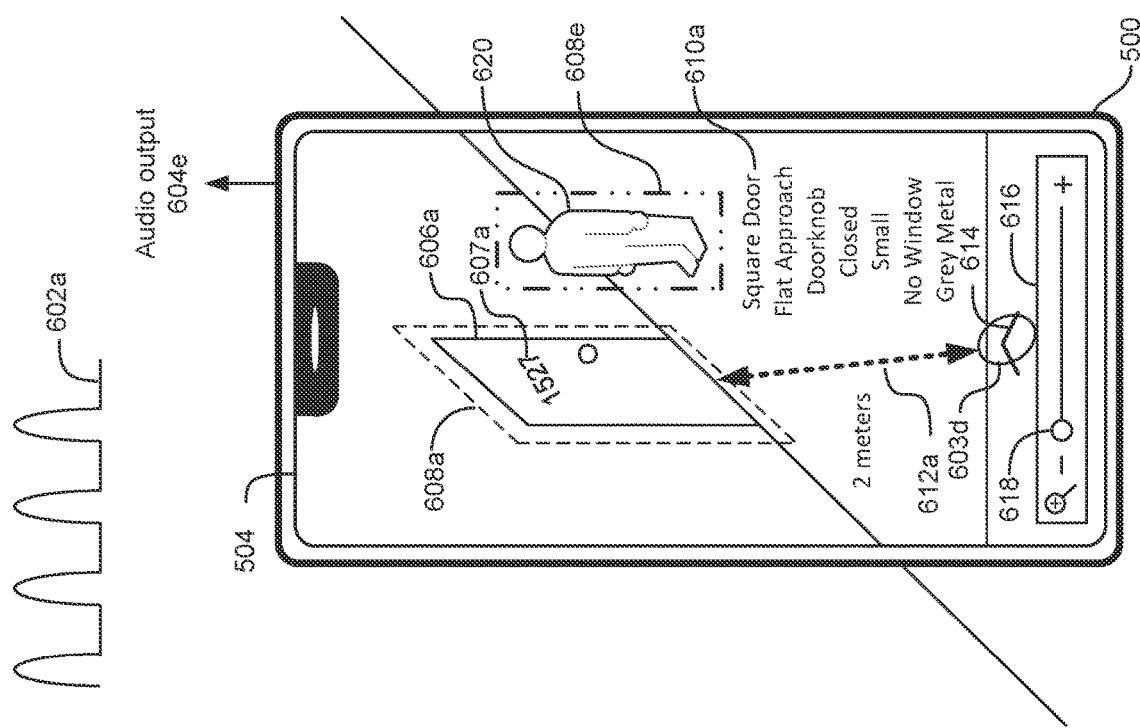

FIG. 6E illustrates an example of the computer system 500 detecting an entry point 606*a* and a person 620 in the environment of the computer system 500. As shown in FIG. 6E, the computer system 500 presents an image that includes entry point 606*a* and person 620. The computer system 500 displays an outline 608*a* around the entry point 606*a* and an outline 608*e* around the person 620. In some embodiments, the entry point 606*a* is the same as the entry point 606*a* in the examples described above with reference to FIGS. 6A-6B. In response to detecting entry point 606*a*, the computer system 500 presents indications 610*a*, 612*a*, and 602*a* described above with reference to FIG. 6A. In some embodiments, the computer system 500 also presents an audio indication 604*e* that includes a spoken indication of the characteristics in indication 610*a* and/or an indication of the distance between the computer system 500 and the entry point 606*a* and/or an indication of the person 620 and/or the distance between the computer system 500 and the person 620. In some embodiments, in response to detecting secondary selection of the person 620 in a similar manner to the input in FIG. 6C, the computer system 500 presents an indication of the distance between the person 620 and the computer system 500 similar to indication 612*a* and/or indication 602*a*. In some embodiments, unless and until such an input is received, the computer system 500 presents the indications corresponding to the entry point 606*a* before presenting the indications corresponding to the person 620 because the computer system 500 is closer to the entry point 606*a* than the computer system 500 is to the person 620. In some embodiments, if the computer system 500 detects the person 620 without detecting the entry point 606*a*, the computer system 500 presents audio and/or tactile pulses similar to pulses 602*a* indicative of the distance between the computer system 500 and the person 620. In some embodiments, if the person 620 is closer to the computer system 500 than the entry point 606*a* is to the computer system 500, the computer system 500 presents audio and/or tactile pulses similar to pulses 602*a* indicative of the distance between the computer system 500 and the person 620.

In some embodiments, the computer system 500 has a plurality of settings related to the types of indications of entry points to be presented and the characteristics of the entry points to be included in the indications. In some embodiments, the user is able to change these settings from a settings user interface accessible in response to a sequence of inputs. In FIG. 6E, the computer system 500 detects an input (e.g., including contact 603*d*) corresponding to a request to display additional selectable options in the user interface illustrated in FIG. 6E. In some embodiments, the additional selectable options include an option that, when selected, causes the computer system 500 to display the settings user interface in FIG. 6F.

FIG. 6F illustrates an example settings user interface displayed by the computer system 500 in response to a sequence of inputs including the input illustrated in FIG. 6E. The settings user interface (e.g., within an application such as a magnifier application) in FIG. 6F includes a selectable option 622*a* that, when selected, causes the computer system 500 to display settings related to the controls in the user interface illustrated in FIGS. 6A-6E. The settings user interface in FIG. 6F includes a selectable option 622*b* that, when selected, causes the computer system 500 to display settings related to color filters available in the user interface illustrated in FIGS. 6A-6E. The settings user interface in FIG. 6F includes a selectable option 622*c* that, when selected, causes the computer system 500 to display settings related to people detection in the user interface illustrated in FIGS. 6A-6E. The settings user interface in FIG. 6F includes a selectable option 622*d* that, when selected, causes the computer system 500 to display settings related to entry point detection in the user interface illustrated in FIGS. 6A-6E. The settings user interface in FIG. 6F includes a selectable option 624 that, when selected, causes the computer system 500 to cease display of the settings user interface and resume display of the user interface illustrated in FIGS. 6A-6E. In FIG. 6F, the computer system 500 detects an input (e.g., including contact 603*e*) selecting the option 622*d* to display the entry point detection settings. In some embodiments, in response to the input illustrated in FIG. 6F, the computer system 500 displays the user interface in FIG. 6G.

FIG. 6G illustrates the computer system 500 displaying a settings user interface for changing settings related to entry point detection in response to the input illustrated in FIG. 6F. In some embodiments, the user is able to use this settings user interface to customize the types of indications presented by the computer system 500 and the characteristics of entry points included in the indications.

As shown in FIG. 6G, the settings include settings for the types of indications to be presented. In some embodiments, the computer system 500 displays a setting 628*a* to present audio feedback in the form of sounds, such as audio pulses 602*a*, 602*b*, 602*c*, and/or 602*d* described above with reference to FIGS. 6A-6E. In some embodiments, the computer system 500 displays a setting 628*b* to present speech feedback in the form of audio outputs, such as audio outputs 604*a*, 604*b*, 604*c*, 604*d*, and/or 604*e* described above with reference to FIGS. 6A-6E. In some embodiments, the computer system 500 displays a setting 628*c* to present tactile feedback in the form of tactile pulses, such as tactile pulses 602*a*, 602*b*, 602*c*, and/or 602*d* described above with reference to FIGS. 6A-6E. In some embodiments, the computer system 500 displays a setting 628*d* to visual feedback, such as visual indications 610*a*, 610*b*, and/or 610*c* described above with reference to FIGS. 6A-6E.

In FIG. 6G, the computer system 500 also displays settings 630*a*-630*g* for selecting the types of characteristics of the entry point to be presented using the indications. In some embodiments, the computer system 500 displays additional characteristic settings in response to detecting a user input to scroll the user interface, such as the input including movement of contact 603*e*. In response to detecting the input illustrated in FIG. 6G, the computer system 500 updates the user interface as shown in FIG. 6H.

FIG. 6H illustrates an example of the computer system 500 updating the settings user interface in response to the scrolling input illustrated in FIG. 6G. In FIG. 6H, the settings user interface includes settings for presenting indications of various characteristics of entry points according to the types of indications selected in the settings user interface. For example, the settings user interface includes an option 630*a* for presenting an indication of the shape of the entry point, an option 630*b* for presenting an indication of the approach of the entry point, an option 630*c* for presenting an indication of the open method of the entry point, an option 630*d* for presenting the size of the entry point, an option 630*e* for presenting an indication of the open state of the entry point, an option 630*f* for presenting an indication of the door handle type, an option 630*g* for presenting an indication of whether or not the entry point includes a window, an option 630*h* for presenting an indication of the color of the entry point, an option 630*i* for presenting an indication of a material of the entry point, and/or an option 630*j* for presenting an indication of a distance between the entry point and the computer system 500. Examples of each of these types of indications are described above with reference to FIGS. 6A-6E.

In some embodiments, in response to user inputs selecting and/or de-selecting one or more of the options described above with reference to FIGS. 6G-6H, the computer system 500 updates the settings for the types of indications to present and the types of characteristics to be included in the indications. In some embodiments, the settings user interface further includes an option 626 that, when selected, causes the computer system 101 to navigate back from the user interface illustrated in FIGS. 6G-6H to the user interface illustrated in FIG. 6F.

FIG. 7 is a flow diagram illustrating a method of detecting and presenting indications of characteristics of physical objects in accordance with some embodiments of the disclosure, such as in FIGS. 6A-6H. The method 700 is optionally performed at an electronic device such as device 100, device 300, or device 500 as described above with reference to FIGS. 1A-1B, 2-3, 4A-4B and 5A-5H. Some operations in method 700 are, optionally combined and/or order of some operations is, optionally, changed.

As described below, the method 700 provides ways to detect and present indications of characteristics of physical objects. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at a computer system in communication with one or more input devices, a camera and/or LiDar scanner, and a display generation component. For example, the computer system is a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the computer system), a handheld device (e.g., external), and/or a controller (e.g., external). In some embodiments, the display generation component is a display integrated with the computer system (optionally a touch screen display), external display such as a monitor, projector, television, or a hardware component (optionally integrated or external) for projecting a user interface or causing a user interface to be visible to one or more users.

In some embodiments, while displaying, via the display generation component, a visual representation of a field of view of the computer system (702), in accordance with a determination that the field of view includes an entry point (e.g., 606a) to a physical location, the computer system (e.g., 500) presents (704) audio (e.g., 604a) describing one or more characteristics of the entry point (e.g., 606a), such as in FIG. 6A. In some embodiments, the visual representation of the field of view of the computer system is an image (e.g., captured using a camera or LiDAR scanner in communication with the computer system). In some embodiments, the visual representation of the field of view of the computer system is an image of the physical environment of the computer system. In some embodiments, the computer system displays the visual representation of the field of view of the computer system while an image having the field of view is being captured. In some embodiments, the visual representation of the field of view of the computer system is captured and/or updated in real-time. For example, the visual representation of the field of view of the computer system is a live video feed from the camera or LiDAR scanner of the device, and the entry point to the physical location is within the field of view of the computer system. In some embodiments, while the computer system captures and displays the visual representation of the field of view of the computer system, the computer system senses proximity of one or more objects in the visual representation of the field of view of the computer system using one or more depth sensors, range sensors, and/or LiDAR. Additionally or alternatively in some embodiments, the computer system analyzes the visual representation of the field of view of the computer system captured using the camera or LiDAR scanner to determine proximity of the one or more objects in the visual representation of the field of view of the computer system. In some embodiments, the entry point is a door, gate, archway, or alleyway. In some embodiments, the physical location is a building or other location defined on a map accessible to (e.g., stored on or accessible via a network connection by) the computer system. In some embodiments, the computer system outputs the audio in accordance with a determination that the computer system is operating in a mode that includes presenting audio indicating characteristics of entry points included in images captured using the camera or LiDAR scanner. In some embodiments, the audio includes spoken words speaking the characteristics of the entry point described in more detail below. In some embodiments, the audio includes pulses, pings, beeps, or other non-verbal sounds that have a characteristic that changes in accordance with a characteristic of the entry point as described in more detail below. In some embodiments, in response to detecting movement of the computer system that causes the entry point to no longer be within a field of view of the computer system, the computer system ceases presenting the audio. In some embodiments, in response to detecting movement of the computer system from an orientation that causes a first entry point to be included in the visual representation of the field of view of the computer system to an orientation that causes the first entry point to no longer be included in the visual representation of the field of view of the computer system and a second entry point to be included in the visual representation of the field of view of the computer system, the computer system ceases presenting audio corresponding to the first entry point and presents audio corresponding to the second entry point. In some embodiments, the computer system displays the visual representation of the field of view of the computer system (e.g., captured using the camera or LiDAR scanner) in response to an input corresponding to a request to launch a visual representation of the field of view of the computer system capturing application.

In some embodiments, while displaying, via the display generation component, the visual indication of the field of view of the computer system (702), in accordance with a determination that the field of view of the computer system does not include the entry point to the physical location, the computer system (e.g., 500) forgoes (706) outputting the audio, such as forgoing presenting audio 604a in FIG. 6A if the setting to present audio is deactivated in the user interface in FIG. 6G. Presenting audio indicating one or more characteristics of the entry point enhances user interactions with the computer system by providing improved feedback to users, such as providing visually-impaired users with audio information corresponding to visual information in the environment of the computer system and the user.

In some embodiments, such as in FIG. 6A, the one or more characteristics of the entry point include a shape of the entry point. In some embodiments, in accordance with a determination that the entry point has a first shape, the audio includes an indication of the first shape. In some embodiments, in accordance with a determination that the entry point has a second shape different from the first shape, the audio includes an indication of the second shape. In some embodiments, if a setting is active that causes the computer system to present a visual indication of the shape of the entry point, the computer system similarly presents a visual indication of either the first or second shape of the entry point. In some embodiments, if a setting is active that causes the computer system to present indications of other characteristics of the entry point and to forgo presenting an indication of the shape of the entry point, the computer system presents the indications of the other characteristics and forgoes presenting the indication of the shape of the entry point. Example entry point shapes include square, rounded, arched, and revolving. Presenting the indication of the shape of the entry point enhances user interactions with the computer system by providing improved feedback to users, such as providing visually-impaired users with information corresponding to visual information in the environment of the computer system and the user.

In some embodiments, such as in FIG. 6A, the one or more characteristics of the entry point include a characteristic of an approach to the entry point. In some embodiments, in accordance with a determination that the entry point has a first approach, the audio includes an indication of the first approach. In some embodiments, in accordance with a determination that the entry point has a second approach different from the first approach, the audio includes an indication of the second approach. In some embodiments, if a setting is active that causes the computer system to present a visual indication of the approach of the entry point, the computer system similarly presents a visual indication of either the first or second approach of the entry point. In some embodiments, if a setting is active that causes the computer system to present indications of other characteristics of the entry point and to forgo presenting an indication of the approach of the entry point, the computer system presents the indications of the other characteristics and forgoes presenting the indication of the approach of the entry point. In some embodiments, the entry point approach type is a characteristic of a surface outside of the entry point. Example entry point approaches include flat, stairs, or ramped. Presenting the indication of the approach of the entry point enhances user interactions with the computer system by providing improved feedback to users, such as providing visually-impaired users with information corresponding to visual information in the environment of the computer system and the user.

In some embodiments, such as in FIG. 6A, the one or more characteristics of the entry point include an access method of the entry point. In some embodiments, in accordance with a determination that the entry point has a first access method, the audio includes an indication of the first access method. In some embodiments, in accordance with a determination that the entry point has a second access method different from the first access method, the audio includes an indication of the second access method. In some embodiments, if a setting is active that causes the computer system to present a visual indication of the access method of the entry point, the computer system similarly presents a visual indication of either the first or second access method of the entry point. In some embodiments, if a setting is active that causes the computer system to present indications of other characteristics of the entry point and to forgo presenting an indication of the access method of the entry point, the computer system presents the indications of the other characteristics and forgoes presenting the indication of the access method of the entry point. Example entry point access methods include push, pull, or revolving. Presenting the indication of the access method of the entry point enhances user interactions with the computer system by providing improved feedback to users, such as providing visually-impaired users with information corresponding to visual information in the environment of the computer system and the user.

In some embodiments, such as in FIG. 6A, the one or more characteristics of the entry point include a size of the entry point. In some embodiments, in accordance with a determination that the entry point has a first size, the audio includes an indication of the first size. In some embodiments, in accordance with a determination that the entry point has a second size different from the first size, the audio includes an indication of the second size. In some embodiments, if a setting is active that causes the computer system to present a visual indication of the size of the entry point, the computer system similarly presents a visual indication of either the first or second size of the entry point. In some embodiments, if a setting is active that causes the computer system to present indications of other characteristics of the entry point and to forgo presenting an indication of the size of the entry point, the computer system presents the indications of the other characteristics and forgoes presenting the indication of the size of the entry point. In some embodiments, the indication of size is qualitative, such as an indication that the entry point is small or large. In some embodiments, the indication of size indicates a number of segments or portions of the entry point, such as the entry point including single or double doors. In some embodiments, the indication of size indicates a quantitative size of the entry point, such as a height and/or width of the entry point in feet or meters. Presenting the indication of the size of the entry point enhances user interactions with the computer system by providing improved feedback to users, such as providing visually-impaired users with information corresponding to visual information in the environment of the computer system and the user.

In some embodiments, such as in FIG. 6A, the one or more characteristics of the entry point include an open state of the entry point. In some embodiments, in accordance with a determination that the entry point has a first open state, the audio includes an indication of the first open state. In some embodiments, in accordance with a determination that the entry point has a second open state different from the first open state, the audio includes an indication of the second open state. In some embodiments, if a setting is active that causes the computer system to present a visual indication of the open state of the entry point, the computer system similarly presents a visual indication of either the first or second open state of the entry point. In some embodiments, if a setting is active that causes the computer system to present indications of other characteristics of the entry point and to forgo presenting an indication of the open state of the entry point, the computer system presents the indications of the other characteristics and forgoes presenting the indication of the open state of the entry point. Example entry point open states include open or closed. Presenting the indication of the open state of the entry point enhances user interactions with the computer system by providing improved feedback to users, such as providing visually-impaired users with information corresponding to visual information in the environment of the computer system and the user.

In some embodiments, such as in FIG. 6A, the one or more characteristics of the entry point include a type of handle included in the entry point. In some embodiments, in accordance with a determination that the entry point has a first type of handle, the audio includes an indication of the first type of handle. In some embodiments, in accordance with a determination that the entry point has a second type of handle different from the first type of handle, the audio includes an indication of the second type of handle. In some embodiments, if a setting is active that causes the computer system to present a visual indication of the type of handle of the entry point, the computer system similarly presents a visual indication of either the first or second type of handle of the entry point. In some embodiments, if a setting is active that causes the computer system to present indications of other characteristics of the entry point and to forgo presenting an indication of the type of handle of the entry point, the computer system presents the indications of the other characteristics and forgoes presenting the indication of the type of handle of the entry point. Example entry point handle types include doorknobs, door handles, door latches, push bars, or pull bars. In some embodiments, in accordance with a determination that the entry point does not include a handle (e.g., the entry point does not include a door), the computer system presents an indication that the entry point does not include a handle (e.g., and/or an indication that the entry point does not include a door). Presenting the indication of the type of handle of the entry point enhances user interactions with the computer system by providing improved feedback to users, such as providing visually-impaired users with information corresponding to visual information in the environment of the computer system and the user.

In some embodiments, such as in FIG. 6A, in accordance with a determination that the entry point (e.g., 606a) includes a door, the one or more characteristics of the entry point include one or more characteristics of the door. In some embodiments, in accordance with a determination that the entry point has a door with one or more first characteristics, the audio includes an indication of the one or more first characteristics. In some embodiments, in accordance with a determination that the entry point has a door with one or more second characteristics different from the one or more first characteristics, the audio includes an indication of the one or more second characteristics. In some embodiments, if a setting is active that causes the computer system to present a visual indication of the characteristics of the door, the computer system similarly presents a visual indication of either the one or more first or second characteristics of the door of the entry point. In some embodiments, if a setting is active that causes the computer system to present indications of other characteristics of the entry point and to forgo presenting an indication of the one or more characteristics of the door of the entry point, the computer system presents the indications of the other characteristics of the entry point and forgoes presenting the indication of the one or more characteristics of the door of the entry point. Example characteristics of the door of the entry point include whether or not the door has a window, the color of the door, or the material of the door. In some embodiments, in accordance with a determination that the entry point does not include a door, the computer system presents an indication that the entry point does not include a door. Presenting the indication of the one or more characteristics of the door of the entry point enhances user interactions with the computer system by providing improved feedback to users, such as providing visually-impaired users with information corresponding to visual information in the environment of the computer system and the user.

In some embodiments, the one or more characteristics of the entry point include a color of a door of the entry point. In some embodiments, in accordance with a determination that the entry point has a door with a first color, the audio includes an indication of the first color of the door. In some embodiments, in accordance with a determination that the entry point has a door with second color different from the first color, the audio includes an indication of the second color. In some embodiments, if a setting is active that causes the computer system to present a visual indication of the color of the door, the computer system similarly presents a visual indication of either the first or second color of the door of the entry point. In some embodiments, if a setting is active that causes the computer system to present indications of other characteristics of the entry point and to forgo presenting an indication of the color of the door of the entry point, the computer system presents the indications of the other characteristics of the entry point and forgoes presenting the indication of the color of the door of the entry point. Example colors of the door of the entry point include silver, black, white, grey, red, orange, yellow, green and blue. In some embodiments, in accordance with a determination that the entry point does not include a door, the computer system presents an indication that the entry point does not include a door.

In some embodiments, the one or more characteristics of the entry point include a material of a door of the entry point. In some embodiments, in accordance with a determination that the entry point has a door with a first material, the audio includes an indication of the first material of the door. In some embodiments, in accordance with a determination that the entry point has a door with second material different from the first material, the audio includes an indication of the second material. In some embodiments, if a setting is active that causes the computer system to present a visual indication of the material of the door, the computer system similarly presents a visual indication of either the first or second material of the door of the entry point. In some embodiments, if a setting is active that causes the computer system to present indications of other characteristics of the entry point and to forgo presenting an indication of the material of the door of the entry point, the computer system presents the indications of the other characteristics of the entry point and forgoes presenting the indication of the material of the door of the entry point. Example materials of the door of the entry point include wood, metal, and plastic. In some embodiments, in accordance with a determination that the entry point does not include a door, the computer system presents an indication that the entry point does not include a door.

In some embodiments, such as in FIG. 6A, the one or more characteristics of the entry point include a distance between the computer system (e.g., 500) and the entry point (e.g., 606*a*). In some embodiments, the distance is a straight line distance. In some embodiments, the distance is a distance along a path that exists from the computer system to the entry point. In some embodiments, in accordance with a determination that the distance between the computer system and the entry point is a first distance, the audio includes an indication of the first distance. In some embodiments, in accordance with a determination that the distance between the entry point and the computer system is a second distance different from the first distance, the audio includes an indication of the second distance. In some embodiments, the indication of the distance between the entry point and the computer system is a series of audio and/or tactile pulses with periods between the pulses that correspond to the distance between the computer system and the entry point. For example, the closer the computer system is to the entry point, the shorter the period between pulses. In some embodiments, if a setting is active that causes the computer system to present a visual indication of the distance between the computer system and the entry point, the computer system presents a visual indication of either the first or second open state of the entry point. In some embodiments, the indication of distance is a quantitative indication. In some embodiments, the visual indication includes a line from the entry point to a predetermined location of the image, such as the middle of the bottom of the image and a visual indication of the distance, such as a number of feet or meters between the computer system and the entry point. In some embodiments, the indication of distance is a qualitative indication (e.g., close or far). In some embodiments, if a setting is active that causes the computer system to present indications of other characteristics of the entry point and to forgo presenting an indication of the distance between the computer system and the entry point, the computer system presents the indications of the other characteristics and forgoes presenting the indication of the distance between the computer system and the entry point. Presenting the indication of the distance between the computer system and the entry point enhances user interactions with the computer system by providing improved feedback to users, such as providing visually-impaired users with information corresponding to visual information in the environment of the computer system and the user.

In some embodiments, such as in FIG. 6A, the audio (e.g., 604*a*) includes pulses (e.g., 602*a*) presented with a characteristic (e.g., a period of time between the pulses). In some embodiments, the pulses are tones, beeps, or other non-verbal sounds.

In some embodiments, such as in FIG. 6A, in accordance with a determination that the distance between the computer system (e.g., 500) and the entry point (e.g., 606a) is a first distance, the characteristic has a first value (e.g., or a plurality of characteristics having first respective values).

In some embodiments, such as in FIG. 6B, in accordance with a determination that the distance between the computer system (e.g., 500) and the entry point (e.g., 606a) is a second distance different from the first distance, the characteristic has a second value, different from the first value (e.g., or a plurality of characteristics having second respective values different from the first respective values described above). In some embodiments, in accordance with a determination that the second distance is greater than the first distance, the second duration of time is greater than the first duration of time. In some embodiments, in accordance with a determination that the second distance is less than the first distance, the second duration of time is greater than the first duration of time. In some embodiments, the computer system additionally or alternatively presents tactile pulses with a period of time between pulses that corresponds to the distance between the computer system and the entry point in a similar manner. Presenting audio pulses separated by a period of time dependent on the distance between the computer system and the entry point enhances user interactions with the computer system by providing improved feedback to users, such as providing visually-impaired users with information corresponding to visual information in the environment of the computer system and the user.

In some embodiments, while displaying, via the display generation component (e.g., 504), the visual representation of the field of view of the electronic device, in accordance with the determination that the field of view includes the entry point, the computer system (e.g., 500) displays, via the display generation component (e.g., 504), a visual indication (e.g., 610a) of the one or more characteristics of the entry point (e.g., 606a) overlaid on the visual representation of the field of view of the electronic device. In some embodiments, the computer system displays, via the display generation component, text overlaid on the visual representation of the field of view of the computer system that lists one or more of the characteristics described above. In some embodiments, the computer system presents the visual indication in response to a setting to display visual indications of characteristics of entry points being active on the electronic device, as described in more detail below. In some embodiments, in accordance with a determination that the setting to display visual indications of characteristics of the entry point is not active on the electronic device, the computer system forgoes presenting the visual indications. In some embodiments, while the setting to display visual indications of the characteristics of the entry point is not active, the computer system presents other types of indications of the characteristics of the entry point, such as audio indications. In some embodiments, the visual indication is placed in the visual representation of the field of view of the computer system at a location proximate to the entry point in the visual representation of the field of view of the electronic device. In some embodiments, in response to detecting a change in the location of the entry point in the image, the computer system updates the position of the visual indication accordingly. Presenting a visual indication of characteristics of the entry point enhances user interactions with the computer system by providing improved feedback to users, such as providing visually-impaired users with information corresponding to visual information in the environment of the computer system and the user.

In some embodiments, while displaying, via the display generation component (e.g., 504), the visual representation of the field of view of the electronic device, the computer system (e.g., 500) receives, via the one or more input devices, a sequence of one or more inputs (e.g., including contact 603d) including selection of a settings option, such as in FIG. 6E.

In some embodiments, in response to the sequence of one or more inputs, the computer system (e.g., 500) displays, via the display generation component (e.g., 504), a settings user interface, such as in FIG. 6F. In some embodiments, the settings user interface includes one or more options described in more detail below. In some embodiments, the settings user interface is a settings user interface of the application in which the image captured (e.g., by the camera or LiDAR sensors) is presented and includes settings directed to features other than the detection of entry points, such as settings related to detection of other objects (e.g., people) and settings for applying visual effects to the visual representation of the field of view of the electronic device, such as color filters. Presenting a settings user interface enhances user interactions with the computer system by enabling the user to customize the types of indications and types of characteristics to present based on the information that is useful to the user.

In some embodiments, such as in FIG. 6G, the settings user interface includes one or more options (e.g., 628a, 628b, 630f, and/or 630g) to toggle activation of one or more types of indications of the one or more characteristics of the entry point. In some embodiments, the types of indications include visual indications, spoken audio indications, tactile pulses, and audio pulses described in more detail above. In some embodiments, the types of indications are available for all of the characteristics of the entry point. In some embodiments, some types of indications are available for some characteristics of the entry point. For example, spoken and visual indications are available for all characteristics of the entry point described above and audio and tactile pulses are available to indicate distance between the computer system and the entry point.

In some embodiments, while displaying, via the display generation component (e.g., 504), the visual representation of the field of view of the electronic device, such as in FIG. 6A, in accordance with the determination that the field of view includes the entry point, in accordance with a determination that a first plurality of types of indications of the one or more characteristics of the entry point are activated, the computer system (e.g., 500) presents the first plurality of types of indications (e.g., 604a, 610a, and/or 612a). For example, if spoken audio indications are activated, but visual indications are deactivated, the computer system presents spoken audio indications of the one or more characteristics of the entry point and forgoes presenting visual indications of the one or more characteristics.

In some embodiments, while displaying, via the display generation component (e.g., 504), the image, such as in FIG. 6C, in accordance with the determination that the one or more criteria are satisfied, in accordance with a determination that a second plurality of types of indications different from the first plurality of types of indications of the one or more characteristics of the entry point are activated, the computer system (e.g., 500) presents the second plurality of types of indications (e.g., 604c, 610b, and/or 612c). For example, if audio pulses are activated but spoken audio indications are deactivated, the computer system presents the audio pulses indicative of the one or more characteristics (e.g., indicating distance between the computer system and the entry point) and forgoes presenting spoken audio indications of the one or more characteristics (e.g., including but not limited to distance between the computer system and the entry point). Presenting a settings user interface to activate and deactivate various types of indications enhances user interactions with the computer system by enabling the user to customize the types of indications and enables the computer system to operate more efficiently by forgoing presenting deactivated types of indications.

In some embodiments, the settings user interface, such as the settings user interface in FIG. 6G, includes an option to toggle activation of visually emphasizing (e.g., outlining) the entry point in the visual representation of the field of view of the computer system (e.g., similar to options 628a, 628b, 628c, and/or 628d).

In some embodiments, while displaying, via the display generation component, the visual representation of the field of view of the electronic device, in accordance with the determination that the field of view includes an entry point, such as in FIG. 6A, in accordance with a determination that visually emphasizing the entry point in the visual representation of the field of view is active, the computer system (e.g., 500) displays visual emphasis (e.g., 608a) of the entry point (e.g., 606a) in the visual representation of the field of view. In some embodiments, the visual emphasis is an outline presented around the outline of the entry point in the visual representation of the field of view of the electronic device. In some embodiments, in response to detecting movement of the entry point within the field of view of the device (e.g., in response to the computer system being moved), the computer system moves the outline around the entry point to follow the visual representation of the field of view of the computer system of the entry point in the visual representation of the field of view of the electronic device. In some embodiments, the outline is presented using one or more augmented reality techniques such that the visual representation of the field of view of the computer system appears as though the outline is present in the environment of the electronic device.

In some embodiments, while displaying, via the display generation component, the visual representation of the field of view, in accordance with the determination that the field of view includes the entry point, in accordance with a determination that visually emphasizing the entry point in the visual representation of the field of view is inactive, the computer system (e.g., 500) forgoes displaying the visual emphasis of the entry point in the visual representation of the field of view, such as forgoing display of visual emphasis 608a in FIG. 6A. Selectively presenting the visual emphasis of the entry point in the visual representation of the field of view enhances user interactions with the computer system by providing improved visual feedback to users when the feature is active and by preserving processing power and/or battery life of the computer system when the feature is not active.

In some embodiments, such as in FIG. 6H, the settings user interface includes a plurality of options (e.g., 630a, 630b, and/or 630c) for selecting the one or more characteristics of the entry point to be indicated while presenting the visual representation of the field of view. In some embodiments, the one or more characteristics include the one or more characteristics described above.

In some embodiments, while displaying, via the display generation component (e.g., 504), the visual representation of the field of view, in accordance with the determination that the field of view includes the entry point, in accordance with a determination that one or more first characteristics of the entry point (e.g., 606a) are selected to be indicated, the audio (e.g., 604a) indicates the one or more first characteristics, such as in FIG. 6A. For example, if a first characteristic is selected and a second characteristic is not selected, the computer system presents an indication of the first characteristic and forgoes presenting an indication of the second characteristic. In some embodiments, the computer system presents types of indications according to the types of indications activated in the settings user interface as described above.

In some embodiments, while displaying, via the display generation component (e.g., 504), the visual representation of the field of view, in accordance with the determination that the field of view includes the entry point, in accordance with a determination that one or more first characteristics of the entry point (e.g., 606b) are selected to be indicated, the audio (e.g., 604c) indicates the one or more second characteristics, such as in FIG. 6C. For example, if the first and second characteristics are selected, the computer system presents indications of the first and second characteristics. As another example, if the second characteristic is selected but the first characteristic is not selected, the computer system presents an indication of the second characteristic and forgoes presenting an indication of the first characteristic. Selectively presenting the indications of respective characteristics enhances user interactions with the computer system by providing improved visual feedback to users when the feature is active and by preserving processing power and/or battery life of the computer system when the feature is not active.

In some embodiments, while displaying, via the display generation component (e.g., 504), the visual representation of the field of view, in accordance with the determination that the field of view includes an entry point, such as in FIG. 6A, in accordance with a determination that one or more signs (e.g., 607a) are within a threshold distance of the entry point (e.g., 606a) (e.g., including signs on the entry point, such as a sign on a door of the entry point; in accordance with a determination the one or more signs are within the field of view of the device), the audio (e.g., 604a) includes an indication of information about the one or more signs (e.g., 607a). In some embodiments, the one or more signs are included in the visual representation of the field of view of the electronic device. In some embodiments, the computer system presents the audio including the indication of information about the one or more signs while presenting the visual representation of the field of view of the computer system including the one or more signs. In some embodiments, the threshold distance is 1, 2, 3, 4, 5, 10, 15, 25, 50, 100 or 1000 centimeters. In some embodiments, the information about the signs includes the characteristics described below. In some embodiments, the computer system is able to present a visual indication of the one or more signs and/or spoken audio indicating the information about the one or more signs. In some embodiments, the visual indication of the one or more signs includes text describing the sign. In some embodiments, in accordance with a determination that the one or more signs are greater than the threshold distance of the entry point, the audio does not include the indication of the information about the one or more signs. Presenting audio indicating the information about the one or more signs enhances user interactions with the computer system by providing improved feedback to users, such as providing visually-impaired users with audio information corresponding to visual information in the environment of the computer system and the user.

In some embodiments, the indication of information about the one or more signs includes a description of one or more symbols included on the one or more signs, such as indication 604*a* including a description of one or more symbols if sign 607*a* included symbols. In some embodiments, in accordance with detecting a respective symbol included on the sign, the computer system presents an indication of the meaning of the symbol. In some embodiments, the computer system detects restroom symbols, accessibility symbols, and/or no smoking symbols (e.g., graphic symbols, not including and/or separate from accompanying text, if any) and presents audio describing the meaning of the symbol on the sign. In some embodiments, the computer system additionally or alternatively presents a visual indication of the symbol on the sign, such as text describing the meaning of the symbol. In some embodiments, the audio includes a spoken description of the symbol and/or sign and the word(s) "symbol" and/or "sign". Presenting audio indicating a description of a symbol included on the one or more signs enhances user interactions with the computer system by providing improved feedback to users, such as providing visually-impaired users with audio information corresponding to visual information in the environment of the computer system and the user.

In some embodiments, in accordance with a determination that one of the one or more signs includes a plurality of symbols, the indication of information about the one or more signs includes descriptions of the plurality of symbols, such as indication 604*a* including a description of one or more symbols if sign 607*a* included symbols. For example, in response to detecting one or more signs that include an accessibility symbol, a men's restroom symbol, and a women's restroom symbol, the computer system presents audio indicating an accessibility symbol, a men's restroom symbol, and a women's restroom symbol. In some embodiments, the audio includes descriptions of the plurality of symbols and the word "symbol". Presenting audio indicating a description of the plurality of symbols included on the one or more signs enhances user interactions with the computer system by providing improved feedback to users, such as providing visually-impaired users with audio information corresponding to visual information in the environment of the computer system and the user.

In some embodiments, such as in FIG. 6A, the indication (e.g., 604*a*) of information about the one or more signs (e.g., 607*a*) includes an indication of placement of the one or more signs (e.g., 607*a*) relative to the entry point (e.g., 606*a*). In some embodiments, sign placements include above the entry point, to the right of the entry point, to the left of the entry point, or on the entry point (e.g., on the door). In some embodiments, the computer system forgoes presenting an indication of a sign that is more than a threshold distance (e.g., 1, 2, 3, 5, 10, 15, 25, 50, 100 or 1000 centimeters) from the entry point. Presenting audio indicating placement of the one or more signs relative to the entry point enhances user interactions with the computer system by providing improved feedback to users, such as providing visually-impaired users with audio information corresponding to visual information in the environment of the computer system and the user.

In some embodiments, in accordance with a determination that one of the one or more signs includes first text at a first size and second text at a second size, in accordance with a determination that the first size is larger than the second size, the indication of information about the one or more signs includes an indication of the first text, such as the indication 604*a* in FIG. 6A if there was text of different sizes in the vicinity of entry point 606*a*. In some embodiments, the indication of information does not include an indication of the second text.

In some embodiments, in accordance with a determination that one of the one or more signs includes first text at a first size and second text at a second size, in accordance with a determination that the second size is larger than the first size, the indication of information about the one or more signs includes an indication of the second text, such as the indication 604*a* in FIG. 6A if there was text of different sizes in the vicinity of entry point 606*a*. In some embodiments, the indication of information does not include an indication of the first text. In some embodiments, when a sign includes text at multiple sizes, the computer system presents an audio indication of the text that has the largest size and forgoes presenting an audio indication of the text that has smaller size(s). In some embodiments, the audio indication includes a spoken reading of the text and the word "text". In some embodiments, when a plurality of signs includes text at multiple sizes, the computer system presents an audio indication of the text that has the largest size and forgoes presenting an audio indication of the text that has smaller size(s). Presenting audio indications of text on a sign that has a large size and forgoing presenting audio indications of text on a sign that has a small size enhances user interactions with the computer system by providing improved feedback to users and conserving processing power and battery life.

In some embodiments, while displaying, via the display generation component (e.g., 504), the visual representation of the field of view of the electronic device, in accordance with a determination that the field of view includes multiple entry points and a determination that a first entry point (e.g., 606*b*) is a first distance from the computer system (e.g., 500) and a second entry point (e.g., 606*c*) is a second distance from the computer system (e.g., 500), such as in FIG. 6C, in accordance with a determination that the first distance is less than the second distance, the computer system (e.g., 500) displays first visual emphasis (e.g., 608*b*) of the first entry point (e.g., 606*b*) in the visual representation of the field of view of the computer system and second visual emphasis (e.g., 608*c*) of the second entry point (e.g., 606*c*) in the visual representation of the field of view of the electronic device, wherein the first visual emphasis (e.g., 608*b*) is greater than the second visual emphasis (e.g., 608*c*). In some embodiments, the entry points are entry points to the same physical location (e.g., entry points to the same building). In some embodiments, the entry points are entry points to different physical locations (e.g., entry points to different buildings). In some embodiments, the first visual emphasis is a first outline and the second visual emphasis is a second outline. In some embodiments, displaying the first outline more visually prominently than the second outline includes displaying the first outline with greater thickness, brighter color, and/or less translucency than the second outline.

In some embodiments, while displaying, via the display generation component (e.g., 504), the visual representation of the field of view of the electronic device, in accordance with a determination that the field of view includes multiple entry points and a determination that the first entry point (e.g., 606*d*) is a first distance from the computer system (e.g., 500) and a second entry point (e.g., 606*c*) is a second distance from the computer system (e.g., 500), such as in FIG. 6C, in accordance with a determination that the first distance is greater than the second distance, the computer system (e.g., 500) displays the first visual emphasis (e.g., 608*d*) of the first entry point (e.g., 606*d*) in the visual representation of the field of view of the computer system and the second visual emphasis (e.g., 608*c*) of the second entry point (e.g., 606*c*) in the visual representation of the field of view of the electronic device, wherein the second visual emphasis (e.g., 608*d*) is greater than the first visual emphasis (e.g., 608*c*). In some embodiments, displaying the second outline more visually prominently than the first outline includes displaying the first outline with greater thickness, brighter color, and/or less translucency than the first outline. In some embodiments, if there are more than two entry points included in the visual representation of the field of view of the electronic device, the computer system displays outlines around the additional entry points with decreasing visual prominence the further the corresponding entry point is from the electronic device. In some embodiments, in response to detecting a change in which entry point is closest to the computer system (e.g., because of movement of the electronic device), the computer system updates the amounts of visual emphasis accordingly. Displaying the greater visual emphasis around the entry point that is closer to the computer system enhances user interactions with the computer system by providing improved feedback to users about visual information in the environment of the computer system and the user.

In some embodiments, such as in FIG. 6C, while displaying, via the display generation component (e.g., 504), the visual representation of the field of view of the electronic device, in accordance with the determination that the field of view includes multiple entry points and in accordance with a determination that the field of view includes a first entry point (e.g., 606*b*) a first distance from the computer system (e.g., 500) and a second entry point (e.g., 606*c*) a second distance from the computer system (e.g., 500), in accordance with a determination that the first distance is less than the second distance, the audio (e.g., 604*c*) includes one or more characteristics of the first entry point (e.g., 606*b*) followed by one or more characteristics of the second entry point (e.g., 606*c*). In some embodiments, the entry points are entry points to the same physical location (e.g., entry points to the same building). In some embodiments, the entry points are entry points to different physical locations (e.g., entry points to different buildings).

In some embodiments, such as in FIG. 6C, while displaying, via the display generation component (e.g., 504), the visual representation of the field of view of the electronic device, in accordance with the determination that the field of view includes multiple entry points and in accordance with a determination that the field of view includes a first entry point (e.g., 606*d*) a first distance from the computer system (e.g., 500) and a second entry point (e.g., 606*c*) a second distance from the computer system (e.g., 500), in accordance with a determination that the first distance is greater than the second distance, the audio (e.g., 604*c*) includes the one or more characteristics of the second entry point (e.g., 606*c*) followed by the one or more characteristics of the first entry point (e.g., 606*d*). In some embodiments, if there are more than two entry points in the field of view, the computer system presents audio indications of the entry points in order from the closest entry point to the computer system to the furthest entry point from the electronic device. In some embodiments, while presenting audio indications of the characteristics of the first entry point, the computer system presents visual indications of the characteristics of the first entry point. In some embodiments, while presenting audio indication of the characteristics of the second entry point, the computer system presents visual indications of the characteristics of the second entry point. In some embodiments, the computer system maintains display of visual indications of characteristics of the entry point closest to the computer system while presenting audio indications of the characteristics of the other entry points. In some embodiments, in response to detecting a change in which entry point is closest to the computer system (e.g., because of movement of the electronic device), the computer system changes the order of presentation of the audio accordingly. Presenting audio characteristics of the entry points in order from the closest entry point to the computer system to the furthest entry point from the computer system enhances user interactions with the computer system by providing improved feedback to the user about visual information in the environment of the computer system and the user.

In some embodiments, while displaying, via the display generation component (e.g., 504), the visual representation of the field of view of the computer system and while an accessibility mode is active on the computer system (e.g., 500), in accordance with a determination that the field of view includes multiple entry points including a first entry point (e.g., 606*b*) and a second entry point (e.g., 606*d*), such as in FIG. 6C, the computer system (e.g., 500) outputs audio (e.g., 604*c*) indicating one or more characteristics of the first entry point (e.g., 606*b*) before outputting audio indicating one or more characteristics of the second entry point (e.g., 606*d*). In some embodiments, the accessibility mode is a mode in which, in response to a user input, the computer system presents audio descriptions of user interface elements (e.g., the user interface element selected by or corresponding to the user input). In some embodiments, while the accessibility mode is active, in response to a secondary selection input of a user interface element, the computer system presents spoken audio describing the user interface element without selecting the user interface element. For example, in response to a three-contact tap on a user interface element displayed on a touch screen, the computer system presents an audio description of the user interface element without selecting the user interface element and in response to a one-contact tap on a user interface element displayed on a touch screen, the computer system selects the user interface element. In some embodiments, the computer system uses the accessibility mode with the entry points in the visual representation of the field of view of the computer system the say the computer system uses the accessibility mode with other user interface elements as described above. In some embodiments, the entry points are entry points to the same physical location (e.g., entry points to the same building). In some embodiments, the entry points are entry points to different physical locations (e.g., entry points to different buildings). In some embodiments, the computer system presents audio indicating the characteristics of the entry points in order from the entry point closest to the computer system to the entry point furthest from the electronic device, as described above. In some embodiments, in accordance with a determination that the field of view includes the entry point are satisfied and in accordance with a determination that the first distance is greater than the second distance, the computer system presents audio indicating one or more characteristics of the second entry point before presenting audio indicating one or more characteristics of the first entry point.

In some embodiments, while displaying, via the display generation component (e.g., 504), the visual representation of the field of view of the computer system and while an accessibility mode is active on the computer system (e.g., 500), in accordance with a determination that the field of view includes multiple entry points including a first entry point (e.g., 606*b*) and a second entry point (e.g., 606*d*), such as in FIG. 6C, while or after outputting the audio (e.g., 604c) indicating the one or more characteristics of the first entry point (e.g., 606b), the computer system (e.g., 500) receives, via the one or more input devices, an input (e.g., including contacts 603b, 603c, and 603d) corresponding to activation of the accessibility mode with respect to the second entry point (e.g., 606d). In some embodiments, the input is an input selecting the second entry point in the visual representation of the field of view of the electronic device. In some embodiments, the input is a swipe input that corresponds to a request to present an audio description of a next user interface element in a user interface (e.g., the second entry point is the next user interface element after the first entry point). In some embodiments, if the second entry point is closer to the computer system than the first entry point, while the computer system is presenting the audio indicating the one or more characteristics of the second entry point, the computer system receives an input corresponding to activation of the accessibility mode with respect to the first entry point. In some embodiments, if the visual representation of the field of view of the computer system includes a third entry point, in response to receiving the swipe input while presenting the audio indicating the one or more characteristics of the second entry point, the computer system presents audio indicating one or more characteristics of the third entry point. In some embodiments, if the visual representation of the field of view of the computer system includes an additional user interface element other than an object (e.g., an entry point or a person) in the visual representation of the field of view of the electronic device, in response to receiving the swipe input while presenting audio indication the one or more characteristics of one of the entry points, the computer system presents audio describing the user interface element. In some embodiments, in response to detecting the swipe input while presenting the audio describing the user interface element, the computer system presents the audio indicating the one or more characteristics of one of the entry points.

In some embodiments, while displaying, via the display generation component (e.g., 504), the visual representation of the field of view of the computer system and while an accessibility mode is active on the computer system (e.g., 500), in accordance with a determination that the field of view includes multiple entry points including a first entry point (e.g., 606b) and a second entry point (e.g., 606d), in response to receiving the input corresponding to the activation of the accessibility mode with respect to the second entry point (e.g., 606d), such as in FIG. 6C, (e.g., ceasing to present the audio indicating the one or more characteristics of the first entry point and) the computer system (e.g., 500) outputs the audio (e.g., 604d) indicating the one or more characteristics of the second entry point (e.g., 606d). In some embodiments, the computer system ceases presenting the audio indicating the one or more characteristics of the first entry point before finishing presenting the audio indicating the one or more characteristics of the first entry point. In some embodiments, after presenting the audio indicating the one or more characteristics of the second entry point, the computer system presents the audio indicating the one or more characteristics of the first entry point. In some embodiments, after presenting the audio indicating the one or more characteristics of the second entry point, the computer system forgoes presenting the audio indicating the one or more characteristics of the first entry point. In some embodiments, if the second entry point is closer to the computer system than the first entry point, in response to receiving an input corresponding to activation of the accessibility mode with respect to the first entry point while the computer system is presenting the audio indicating the one or more characteristics of the second entry point, the computer system presents audio indicating the one or more characteristics of the first entry point. Presenting the audio indication of the characteristics of the second entry point in response to receiving the input corresponding to activating the accessibility mode with respect to the second entry point while presenting the audio indication of the characteristics of the first entry point enhances user interactions with the computer system by providing improved feedback to the user about visual information in the environment of the computer system and the user.

In some embodiments, the computer system identifies a plurality of entry points in the visual representation of the field of view of the computer system and presents indications of characteristics of the entry points. In some embodiments, the computer system identifies up to a predetermined threshold number (e.g., 2, 3, 4, 5, 10, or 20) of entry points in the visual representation of the field of view of the computer system that are closest to the electronic device.

In some embodiments, while displaying, via the display generation component (e.g., 504), the visual representation of the field of view of the computer system (e.g., and while an accessibility mode is active on the electronic device), such as in FIG. 6C, the computer system (e.g., 500) receives, via the one or more input devices, an input corresponding to selection of the entry point (e.g., 606d) (e.g., activation of the accessibility mode with respect to the entry point). In some embodiments, the accessibility mode is the mode in which, in response to a user input, the computer system presents audio descriptions of user interface elements described in more detail above. In some embodiments, the input is secondary selection using the accessibility mode as described above. In some embodiments, the input is selection of the entry point independent from the accessibility mode. In some embodiments, the computer system detects selection of the entry point while the accessibility mode is not active and responds as described below.

In some embodiments, while displaying, via the display generation component (e.g., 504), the visual representation of the field of view of the computer system (e.g., and while an accessibility mode is active on the electronic device), in response to receiving the input corresponding to the selection of the entry point (e.g., 606d) (e.g., the activation of the accessibility mode with respect to the entry point), such as in FIG. 6C, the computer system (e.g., 500) outputs second audio (e.g., 604d) indicating one or more second characteristics of the entry point (e.g., 604d) not included in the audio indicating the one or more characteristics of the entry point. In some embodiments, the second audio corresponds to characteristics presented in a visual indication of the second characteristics of the entry point that are not included in the one or more characteristics of the entry point included in the audio indication. In some embodiments, the computer system presents additional audio information in response to detecting the input corresponding to activation of the accessibility mode with respect to the entry point. In some embodiments, if the visual representation of the field of view of the computer system includes multiple entry points, in response to detecting an input corresponding to selection of a first entry point of the plurality of entry points, the computer system presents second audio indicating one or more characteristics of the first entry point and in response to detecting an input corresponding to selection of a second entry point different from the first entry point of the plurality of entry points, the computer system presents second audio indicating one or more characteristics of the second entry point. Presenting additional audio indications in response to detecting selection of the entry point enhances user interactions with the computer system by providing improved feedback to users about visual information in the environment of the computer system and the user.

In some embodiments, while displaying, via the display generation component (e.g., 504), the visual representation of the field of view of the electronic device, such as in FIG. 6E, in accordance with a determination that the field of view includes an object (e.g., 620) other than an entry point, the computer system (e.g., 500) outputs audio indicating one or more characteristics of the object (e.g., 620). In some embodiments, the computer system outputs the audio indicating the one or more characteristics of the object is in accordance with a determination that a setting for presenting audio indicating the one or more characteristics of people is active on the electronic device. In some embodiments, the audio indicating the one or more characteristics of the person includes pulses separated by a period of time that corresponds to the distance between the computer system and the person in a manner similar to the manner in which the computer system presents pulses indicating the distance between the computer system and the entry point described above. In some embodiments, the computer system additionally or alternatively presents tactile pulses in a similar manner. In some embodiments, the computer system displays a visual indication of the distance between the person and the electronic device. In some embodiments, the computer system provides the audio indication of the entry point and the audio indication of the person in an order from the closest object to the computer system to the furthest object from the computer system as described above with respect to multiple entry points. In some embodiments, the computer system displays and/or provides the same or analogous feedback about the object other than the entry point as it does for entry points. Presenting audio indicating one or more characteristics of the object enhances user interactions with the computer system by providing enhanced feedback to the user about visual information in the environment of the electronic device.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 7 are, optionally, implemented by components depicted in FIGS. 1A-1B. For example, outputting operation 704 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the ability for users to receive indications of visual information in the environment of the computer system and the user. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to identify the location of the computer system and/or identify the location of the user. Accordingly, use of such personal information data enables users to identify, find, and otherwise interact with one or more objects in the environment of the user and/or electronic device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide personal data and/or device or object location data. In yet another example, users can select to limit the length of time personal data and/or device or object location data is maintained or entirely block the development of a baseline location profile. In addition to providing "opt in" and "opt out" options, the present disclosure contemplates providing notifications relating to the access or use of personal information. For instance, a user may be notified upon downloading an application that their personal information data and/or location data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data and notifications can be delivered to users based on aggregated non-personal information data or a bare minimum amount of personal information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at a computer system in communication with one or more input devices, including one or more optical sensors, and a display generation component:
capturing, via the one or more optical sensors, one or more images of a physical environment of the computer system, corresponding to a field of view of the computer system; and
while displaying, via the display generation component, a visual representation of the field of view of the computer system captured via the one or more optical sensors:
in accordance with a determination that the field of view includes an entry point to a physical location, at a location in relation to the computer system, outputting audio describing one or more characteristics of the entry point including a characteristic of the entry point other than the location in relation to the computer system; and
in accordance with a determination that the field of view of the computer system does not include an entry point to a physical location, forgoing outputting the audio.

2. The method of claim 1, wherein the one or more characteristics of the entry point include a shape of the entry point.

3. The method of claim 1, wherein the one or more characteristics of the entry point include a characteristic of an approach to the entry point.

4. The method of claim 1, wherein the one or more characteristics of the entry point include an access method of the entry point.

5. The method of claim 1, wherein the one or more characteristics of the entry point include a size of the entry point.

6. The method of claim 1, wherein the one or more characteristics of the entry point include an open state of the entry point.

7. The method of claim 1, wherein the one or more characteristics of the entry point include a type of handle included in the entry point.

8. The method of claim 1, wherein in accordance with a determination that the entry point includes a door, the one or more characteristics of the entry point include one or more characteristics of the door.

9. The method of claim 1, wherein the one or more characteristics of the entry point include a distance between the computer system and the entry point.

10. The method of claim 9, wherein the audio includes pulses presented with a characteristic, and
in accordance with a determination that the distance between the computer system and the entry point is a first distance, the characteristic has a first value, and
in accordance with a determination that the distance between the computer system and the entry point is a second distance different from the first distance, the characteristic has a second value, different from the first value.

11. The method of claim 1, further comprising:
while displaying, via the display generation component, the visual representation of the field of view of the computer system:

in accordance with the determination that the field of view includes the entry point, displaying, via the display generation component, a visual indication of the one or more characteristics of the entry point overlaid on the visual representation of the field of view of the computer system.

12. The method of claim 1, further comprising:
while displaying, via the display generation component, the visual representation of the field of view of the computer system:
receiving, via the one or more input devices, a sequence of one or more inputs including selection of a settings option; and
in response to the sequence of one or more inputs:
displaying, via the display generation component, a settings user interface.

13. The method of claim 12, wherein the settings user interface includes one or more options to toggle activation of one or more types of indications of the one or more characteristics of the entry point, and the method further comprises:
while displaying, via the display generation component, the visual representation of a field of view of the computer system:
in accordance with the determination that the field of view includes an entry point:
in accordance with a determination that a first plurality of types of indications of the one or more characteristics of the entry point are activated, presenting the first plurality of types of indications; and
in accordance with a determination that a second plurality of types of indications different from the first plurality of types of indications of the one or more characteristics of the entry point are activated, presenting the second plurality of types of indications.

14. The method of claim 12, wherein the settings user interface includes an option to toggle activation of visually emphasizing the entry point in the visual representation of the field of view of the computer system, and the method further comprises:
while displaying, via the display generation component, the visual representation of a field of view of the computer system:
in accordance with the determination that the field of view includes an entry point:
in accordance with a determination that visually emphasizing the entry point in the visual representation of the field of view of the computer system is active, displaying visual emphasis of the entry point in the visual representation of the field of view; and
in accordance with a determination that visually emphasizing the entry point in the visual representation of the field of view is inactive, forgoing displaying the visual emphasis of the entry point in the visual representation of the field of view.

15. The method of claim 12, wherein the settings user interface includes a plurality of options for selecting the one or more characteristics of the entry point to be indicated while presenting the visual representation of the field of view, wherein:
while displaying, via the display generation component, the visual representation of the field of view:
in accordance with the determination that the field of view includes an entry point:
in accordance with a determination that one or more first characteristics of the entry point are selected to be indicated, the audio indicates the one or more first characteristics, and
in accordance with a determination that one or more second characteristics different form the one or more first characteristics of the entry point are selected to be indicated, the audio indicates the one or more second characteristics.

16. The method of claim 1, further comprising:
while displaying, via the display generation component, the visual representation of the field of view of the computer system:
in accordance with the determination that the field of view includes an entry point,
in accordance with a determination that one or more signs are within a threshold distance of the entry point, the audio includes an indication of information about the one or more signs.

17. The method of claim 16, wherein the indication of information about the one or more signs includes a description of one or more symbols included on the one or more signs.

18. The method of claim 17, wherein in accordance with a determination that one of the one or more signs includes a plurality of symbols, the indication of information about the one or more signs includes descriptions of the plurality of symbols.

19. The method of claim 16, wherein the indication of information about the one or more signs includes an indication of placement of the one or more signs relative to the entry point.

20. The method of claim 16, wherein in accordance with a determination that one of the one or more signs includes first text at a first size and second text at a second size:
in accordance with a determination that the first size is larger than the second size, the indication of information about the one or more signs includes an indication of the first text, and
in accordance with a determination that the second size is larger than the first size, the indication of information about the one or more signs includes an indication of the second text.

21. The method of claim 1, further comprising:
while displaying, via the display generation component, the visual representation of the field of view of the computer system:
in accordance with a determination that the field of view includes multiple entry points and a determination that a first entry point is a first distance from the computer system and a second entry point is a second distance from the computer system:
in accordance with a determination that the first distance is less than the second distance, displaying first visual emphasis of the first entry point in the visual representation of the field of view of the computer system and second visual emphasis of the second entry point in the visual representation of the field of view of the computer system, wherein the first visual emphasis is greater than the second visual emphasis; and
in accordance with a determination that the first distance is greater than the second distance, displaying the first visual emphasis of the first entry point in the visual representation of the field of view and the second visual emphasis of the second entry point in the visual representation of the field of view, wherein the second visual emphasis is greater than the first visual emphasis.

22. The method of claim 1, wherein:
while displaying, via the display generation component, the visual representation of the field of view of the computer system:
in accordance with the determination that the field of view includes multiple entry points and in accordance with a determination that the field of view includes a first entry point a first distance from the computer system and a second entry point a second distance from the computer system:
in accordance with a determination that the first distance is less than the second distance, the audio includes one or more characteristics of the first entry point followed by one or more characteristics of the second entry point; and
in accordance with a determination that the first distance is greater than the second distance, the audio includes the one or more characteristics of the second entry point followed by the one or more characteristics of the first entry point.

23. The method of claim 1, further comprising:
while displaying, via the display generation component, the visual representation of the field of view and while an accessibility mode is active on the computer system:
in accordance with a determination that field of view includes multiple entry points including a first entry point and a second entry point:
outputting audio indicating one or more characteristics of the first entry point before outputting audio indicating one or more characteristics of the second entry point;
and while or after outputting the audio indicating the one or more characteristics of the first entry point, receiving, via the one or more input devices, an input corresponding to activation of the accessibility mode with respect to the second entry point; and
in response to receiving the input corresponding to the activation of the accessibility mode with respect to the second entry point, outputting the audio indicating the one or more characteristics of the second entry point.

24. The method of claim 1, further comprising:
while displaying, via the display generation component, the visual representation of the field of view of the computer system:
receiving, via the one or more input devices, an input corresponding to selection of the entry point; and
in response to receiving the input corresponding to the selection of the entry point, outputting second audio indicating one or more second characteristics of the entry point not included in the audio indicating the one or more characteristics of the entry point.

25. The method of claim 1, further comprising:
while displaying, via the display generation component, the visual representation of the field of view:
in accordance with a determination that the field of view includes an object other than an entry point, outputting audio indicating one or more characteristics of the object.

26. A computer system, comprising:
one or more processors;
memory; and
one or more programs, wherein the one or more programs are stored in the memory and configured to be executed by the one or more processors, the one or more programs including instructions for:
capturing, via one or more optical sensors, one or more images of a physical environment of the computer system, corresponding to a field of view of the computer system; and
while displaying, via a display generation component, a visual representation of the field of view of the computer system captured via the one or more optical sensors:
in accordance with a determination that the field of view includes an entry point to a physical location, at a location in relation to the computer system, outputting audio describing one or more characteristics of the entry point including a characteristic of the entry point other than the location in relation to the computer system; and
in accordance with a determination that the field of view of the computer system does not include an entry point to a physical location, forgoing outputting the audio.

27. A non-transitory computer readable storage medium storing one or more programs, the one or more programs comprising instructions, which when executed by one or more processors of an computer system, cause the computer system to perform a method comprising:
capturing, via one or more optical sensors, one or more images of a physical environment of the computer system, corresponding to a field of view of the computer system; and
while displaying, via a display generation component, a visual representation of the field of view of the computer system:
in accordance with a determination that the field of view includes an entry point to a physical location, at a location in relation to the computer system, outputting audio describing one or more characteristics of the entry point including a characteristic of the entry point other than the location in relation to the computer system; and
in accordance with a determination that the field of view of the computer system does not include an entry point to a physical location, forgoing outputting the audio.

* * * * *